(12) United States Patent
Purkayastha et al.

(10) Patent No.: US 11,882,610 B2
(45) Date of Patent: Jan. 23, 2024

(54) ESTABLISHING CONNECTIONS USING MULTIPLE SUBSCRIBER IDENTITY MODULES VIA A SINGLE COMMUNICATION LINK

(71) Applicant: QUALCOMM Incorporated, San Diego, CA (US)

(72) Inventors: Punyaslok Purkayastha, San Diego, CA (US); Gavin Bernard Horn, La Jolla, CA (US); Ozcan Ozturk, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 17/398,908

(22) Filed: Aug. 10, 2021

(65) Prior Publication Data

US 2022/0053586 A1     Feb. 17, 2022

Related U.S. Application Data

(60) Provisional application No. 63/065,330, filed on Aug. 13, 2020.

(51) Int. Cl.
*H04W 76/15* (2018.01)
*H04W 8/20* (2009.01)
(Continued)

(52) U.S. Cl.
CPC ............ *H04W 76/15* (2018.02); *H04W 8/20* (2013.01); *H04W 74/0833* (2013.01); *H04W 76/11* (2018.02)

(58) Field of Classification Search
CPC .. H04W 76/11; H04W 76/15; H04W 74/0833
See application file for complete search history.

(56) References Cited

U.S. PATENT DOCUMENTS

2015/0341825 A1* 11/2015 Soriaga ................. H04W 76/15
455/450
2016/0278128 A1* 9/2016 Krishnamurthy ... H04W 74/085
(Continued)

FOREIGN PATENT DOCUMENTS

WO     2018141148 A1    8/2018
WO     WO2018/141081     *   8/2018

OTHER PUBLICATIONS

Sony, Convida Wireless; "Discussion on Multi-SIM"; 3GPP TSG-RAN WG2 Meeting #112 e Online, Nov. 2-13, 2020; R2-2009885 (Year: 2020).*

(Continued)

*Primary Examiner* — Gary Mui
(74) *Attorney, Agent, or Firm* — Loza & Loza, LLP

(57) ABSTRACT

Aspects of the disclosure relate to establishing connections between a user equipment (UE) and a base station via a communication link using multiple subscriptions. In an aspect, a UE configured to communicate using a first subscription and a second subscription may establish a first connection with a base station via a communication link using the first subscription of the UE and may establish a second connection with the base station via the communication link using the second subscription of the UE. The UE may further perform a second connection with the base station via the communication link using the second subscription of the UE.

30 Claims, 12 Drawing Sheets

(51) Int. Cl.
*H04W 74/08* (2009.01)
*H04W 76/11* (2018.01)

(56) References Cited

U.S. PATENT DOCUMENTS

| | | | |
|---|---|---|---|
| 2016/0295541 A1* | 10/2016 | Jaiswal | H04W 56/001 |
| 2017/0150545 A1* | 5/2017 | Ramkumar | H04W 8/082 |
| 2017/0265058 A1* | 9/2017 | Sahu | H04W 76/16 |
| 2020/0053585 A1* | 2/2020 | Saxena | H04W 72/085 |
| 2021/0252103 A1* | 8/2021 | Briner | A61K 45/06 |
| 2021/0282103 A1 | 9/2021 | Zhu et al. | |
| 2022/0053520 A1* | 2/2022 | Purkayastha | H04W 72/1289 |
| 2022/0086933 A1* | 3/2022 | Österlund | H04W 68/005 |
| 2022/0191825 A1* | 6/2022 | Nord | H04W 68/02 |

OTHER PUBLICATIONS

Vivo, China Telecom, China Unicom; "Support for Multi-SIM devices for LTE/NR"; 3GPP TSG RAN Meeting #88e Electronic Meeting, Jun. 29-Jul. 3, 2020; RP-201309 (Year: 2020).*

* cited by examiner

ESTABLISHING CONNECTIONS USING MULTIPLE SUBSCRIBER IDENTITY MODULES VIA A SINGLE COMMUNICATION LINK

PRIORITY CLAIM

This application claims priority to and the benefit of provisional patent application No. 63/065,330 filed in the United States Patent & Trademark Office on Aug. 13, 2020, the entire content of which is incorporated herein by reference as if fully set forth below in its entirety and for all applicable purposes.

TECHNICAL FIELD

The technology discussed below relates generally to wireless communication systems, and more particularly, to establishing connections between a user equipment and a base station using multiple subscriptions via a communication link.

INTRODUCTION

A user equipment (UE) often uses a subscription to connect to a service network, which provides one or more services such as a voice call service or a data service. For example, a subscription used by the UE may be associated with a subscription module or device such as a subscriber identity module (SIM) that the UE accesses to use the subscription. With development of the subscription based services, a UE that is capable of using two or more subscriptions are increasingly used. In one example, a UE may implement a dual SIM that allows the UE to connect to a service network using two different subscriptions respectively provided by two SIMs. Various Improvements for a UE configured to use multiple subscriptions are being studied.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to establishing connections between a user equipment (UE) and a base station via a communication link using multiple subscriptions. A feature related to establishing connections using multiple subscriptions via a common communication link has not been explored. Therefore, the disclosure provides approaches to establish and utilize connections using multiple subscriptions via a common communication link.

In one example, a method of wireless communication by a UE configured to communicate using a first subscription and a second subscription is disclosed. The method includes establishing a first connection with a base station via a communication link using the first subscription of the UE, establishing a second connection with the base station via the communication link using the second subscription of the UE, and performing at least one of a first communication, via the communication link, using the first subscription, or a second communication, via the communication link, using the second subscription. In an aspect, the first connection may be a first radio resource control (RRC) connection and the second connection may be a second RRC connection.

In an aspect, the establishing the first connection via the communication link using the first subscription may include performing a random access channel (RACH) procedure with the base station and a first RRC connection establishment procedure with the base station using the first subscription, and establishing the second connection via the communication link using the second subscription may include performing a second RRC connection establishment procedure with the base station using the second subscription without performing a RACH procedure. In an aspect, the second RRC connection establishment procedure may be performed without performing a RACH procedure to reduce latency associated with the second RRC connection establishment procedure.

In an aspect, the second connection may be established while the first connection established is active, and the establishing the second connection may include transmitting a RRC setup request to establish the second connection over at least one of a first signaling radio bearer (SRB) associated with the first connection or a second SRB associated with the second connection. In an aspect, the establishing the second connection may further include receiving an RRC setup message in response to the RRC setup request, wherein the RRC setup message is addressed to a first cell radio network temporary identifier (C-RNTI) associated with the first connection. In an aspect, the RRC setup message may include a second C-RNTI associated with the second connection.

In an aspect, the first subscription may be associated with first security information and the second subscription may be associated with second security information different from the first security information.

In an aspect, the first communication may be a first RRC communication and the second communication may be a second RRC communication, and the first RRC communication may be performed via the first connection on the communication link and the second RRC communication may be performed via the second connection on the communication link.

In an aspect, the at least one of the first communication using the first subscription or the second communication using the second subscription may be performed via a UE protocol stack having a physical layer and a media access (MAC) layer that are shared for the first subscription and the second subscription. In an aspect, the first communication using the first subscription may be performed via a plurality of first upper layers in the UE protocol stack that are above the MAC layer, and the second communication using the second subscription may be performed via a plurality of second upper layers in the UE protocol stack that are above the MAC layer. In an aspect, first communication may be performed using a first set of the plurality of first upper layers via at least one first SRB and using a second set of the plurality of first upper layers via at least one first dedicated radio bearer (DRB), the at least one first SRB and the at least one first DRB being associated with the first subscription, and first communication may be performed using a first set of the plurality of first upper layers via at least one first SRB and using a second set of the plurality of first upper layers via at least one first DRB, the at least one first SRB and the at least one first DRB being associated with the first subscription.

In an aspect, the first set of the plurality of first upper layers may include a first RRC layer, a first packet data convergence protocol (PDCP) layer of the plurality of first upper layers, a first radio link control (RLC) layer of the plurality of first upper layers, and the second set of the plurality of first upper layers may include a first service data adaptation protocol (SDAP) layer, a second PDCP layer of the plurality of first upper layers, a second RLC layer of the plurality of first upper layers, and the first set of the plurality of second upper layers may include a second radio resource control (RRC) layer, a first PDCP layer of the plurality of second upper layers, a first RLC layer of the plurality of second upper layers, and the second set of the plurality of second upper layers may include a second SDAP layer, a second PDCP layer of the plurality of second upper layers, a second RLC layer of the plurality of second upper layers.

In another example, a UE for wireless communication is disclosed, the UE being configured to communicate using a first subscription and a second subscription. The UE includes at least one processor, a transceiver communicatively coupled to the at least one processor, and a memory communicatively coupled to the at least one processor. The at least one processor may be configured to establish a first connection with a base station via a communication link using the first subscription of the UE, establish a second connection with the base station via the communication link using the second subscription of the UE, and perform at least one of a first communication, via the communication link, using the first subscription, or a second communication, via the communication link, using the second subscription.

In another example, a non-transitory processor-readable storage medium having instructions for a user equipment (UE) thereon may be disclosed, where the UE is configured to communicate using a first subscription and a second subscription. The instructions, when executed by a processing circuit, cause the processing circuit to establish a first connection with a base station via a communication link using the first subscription of the UE, establish a second connection with the base station via the communication link using the second subscription of the UE, and perform at least one of a first communication, via the communication link, using the first subscription, or a second communication, via the communication link, using the second subscription.

In a further example, a base station for wireless communication may be disclosed. The base station includes means for establishing a first connection with a base station via a communication link using the first subscription of the UE, means for establishing a second connection with the base station via the communication link using the second subscription of the UE, and means for performing at least one of a first communication, via the communication link, using the first subscription, or a second communication, via the communication link, using the second subscription.

In one example, a method of wireless communication by a base station is disclosed. The method includes establishing a first connection with a UE via a communication link using a first subscription of the UE, the UE being configured to communicate using the first subscription and a second subscription, establishing a second connection with the UE via the communication link using the second subscription of the UE, and performing at least one of a first communication, via the communication link, using the first subscription or a second communication, via the communication link, using the second subscription. In an aspect, the first connection may be a first RRC connection and the second connection may be a second RRC connection.

In an aspect, the establishing the first connection via the communication link using the first subscription may include performing a RACH procedure with the UE and a first RRC connection establishment procedure with the UE using the first subscription, and establishing the second connection via the communication link using the first subscription may include performing a second RRC connection establishment procedure with the UE using the second subscription without performing a RACH procedure. In an aspect, the second RRC connection establishment procedure may be performed without performing a RACH procedure to reduce latency associated with the second RRC connection establishment procedure.

In an aspect, the second connection may be established while the first connection established may be active. In this aspect, the establishing the second connection may include receiving an RRC setup request to establish the second connection over at least one of a first SRB associated with the first connection or a second SRB associated with the second connection. In an aspect, the establishing the second connection further may include transmitting an RRC setup message in response to the RRC setup request, wherein the RRC setup message is addressed to a first cell radio network temporary identifier C-RNTI associated with the first connection. In an aspect, the RRC setup message may include a second C-RNTI associated with the second connection.

In an aspect, the at least one of the first communication using the first subscription or the second communication using the second subscription may be performed via a base station protocol stack having a physical layer and a MAC layer that are shared for the first subscription and the second subscription. In an aspect, the first communication using the first subscription may be performed via a plurality of first upper layers in the base station protocol stack that are above the MAC layer, and the second communication using the second subscription may be performed via a plurality of second upper layers in the base station protocol stack that are above the MAC layer.

In an aspect, the first communication may be performed using a first set of the plurality of first upper layers via at least one first SRB and using a second set of the plurality of first upper layers via at least one first DRB, the at least one first SRB and the at least one first DRB being associated with the first subscription, and the second communication may be performed using a first set of the plurality of second upper layers via at least one second SRB and using a second set of the plurality of second upper layers via at least one second DRB, the at least one second SRB and the at least one second DRB being associated with the second subscription. In an aspect, the first set of the plurality of first upper layers may include a first RRC layer, a first PDCP layer of the plurality of first upper layers, a first RLC layer of the plurality of first upper layers, and the second set of the plurality of first upper layers may include a first SDAP layer, a second PDCP layer of the plurality of first upper layers, a second RLC layer of the plurality of first upper layers, and the first set of the plurality of second upper layers may include a second RRC layer, a first PDCP layer of the plurality of second upper layers, a first RLC layer of the plurality of second upper layers, and the second set of the plurality of second upper layers may include a second SDAP layer, a second PDCP layer of the plurality of second upper layers, a second RLC layer of the plurality of second upper layers.

In an aspect, the establishing the first connection via the communication link using the first subscription may include receiving a first subscriber identity associated with the first subscription, and managing communication of one or more first messages associated with the first subscription between a distributed unit of the base station and a control plane of a centralized unit of the base station based on the first subscriber identity. In an aspect, the establishing the second connection via the communication link using the second subscription may include receiving a second subscriber identity associated with the second subscription, and managing communication of one or more second messages associated with the second subscription between the distributed unit of the base station and the control plane of the centralized unit of the base station based on the second subscriber identity. In an aspect, the first subscriber identity may be a first serving temporary mobile subscriber identity (S-TMSI) identifying the first subscription and the second subscriber identity may be a second S-TMSI identifying the second subscription.

In an aspect, the one or more first messages include a first subscription identifier associated with the first subscription based on the first subscriber identity, and the one or more second messages include a second subscription identifier associated with the second subscription based on the second subscriber identity. In an aspect, the one or more first messages are communicated via a first logical connection associated with the first subscription on a communication interface between the distributed unit and the control plane of the centralized unit of the base station, and the one or more second messages are communicated via a second logical connection associated with the second subscription on the communication interface between the distributed unit and the control plane of the centralized unit of the base station. In an aspect, the control plane of the centralized unit of the base station may include a first control plane associated with the first subscription and a second control plane associate with the second subscription, and the one or more first messages are communicated with the first control plane of the centralized unit of the base station, and the one or more second messages are communicated with the second control plane of the centralized unit of the base station. In an aspect, the one or more first messages include one or more first SRB identifiers associated with the first subscription, and the one or more second messages include one or more second SRB identifiers associated with the second subscription.

In an aspect, the first subscription may be associated with first security information and the second subscription may be associated with second security information different from the first security information.

In an aspect, the first communication may be a first RRC communication and the second communication may be a second RRC communication, and the first RRC communication may be performed via the first connection on the communication link and the second RRC communication may be performed via the second connection on the communication link.

In another example, a base station for wireless communication is disclosed. The base station includes at least one processor, a transceiver communicatively coupled to the at least one processor, and a memory communicatively coupled to the at least one processor. The at least one processor may be configured to establish a first connection with a UE via a communication link using a first subscription of the UE, the UE being configured to communicate using the first subscription and a second subscription, establish a second connection with the UE via the communication link using the second subscription of the UE, and perform at least one of a first communication, via the communication link, using the first subscription or a second communication, via the communication link, using the second subscription.

In another example, a non-transitory processor-readable storage medium having instructions for a base station thereon may be disclosed. The instructions, when executed by a processing circuit, cause the processing circuit to establish a first connection with a UE via a communication link using a first subscription of the UE, the UE being configured to communicate using the first subscription and a second subscription, establish a second connection with the UE via the communication link using the second subscription of the UE, and perform at least one of a first communication, via the communication link, using the first subscription or a second communication, via the communication link, using the second subscription.

In a further example, a base station for wireless communication may be disclosed. The base station includes means for establishing a first connection with a user equipment (UE) via a communication link using a first subscription of the UE, the UE being configured to communicate using the first subscription and a second subscription, means for establishing a second connection with the UE via the communication link using the second subscription of the UE, and means for performing at least one of a first communication, via the communication link, using the first subscription or a second communication, via the communication link, using the second subscription.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
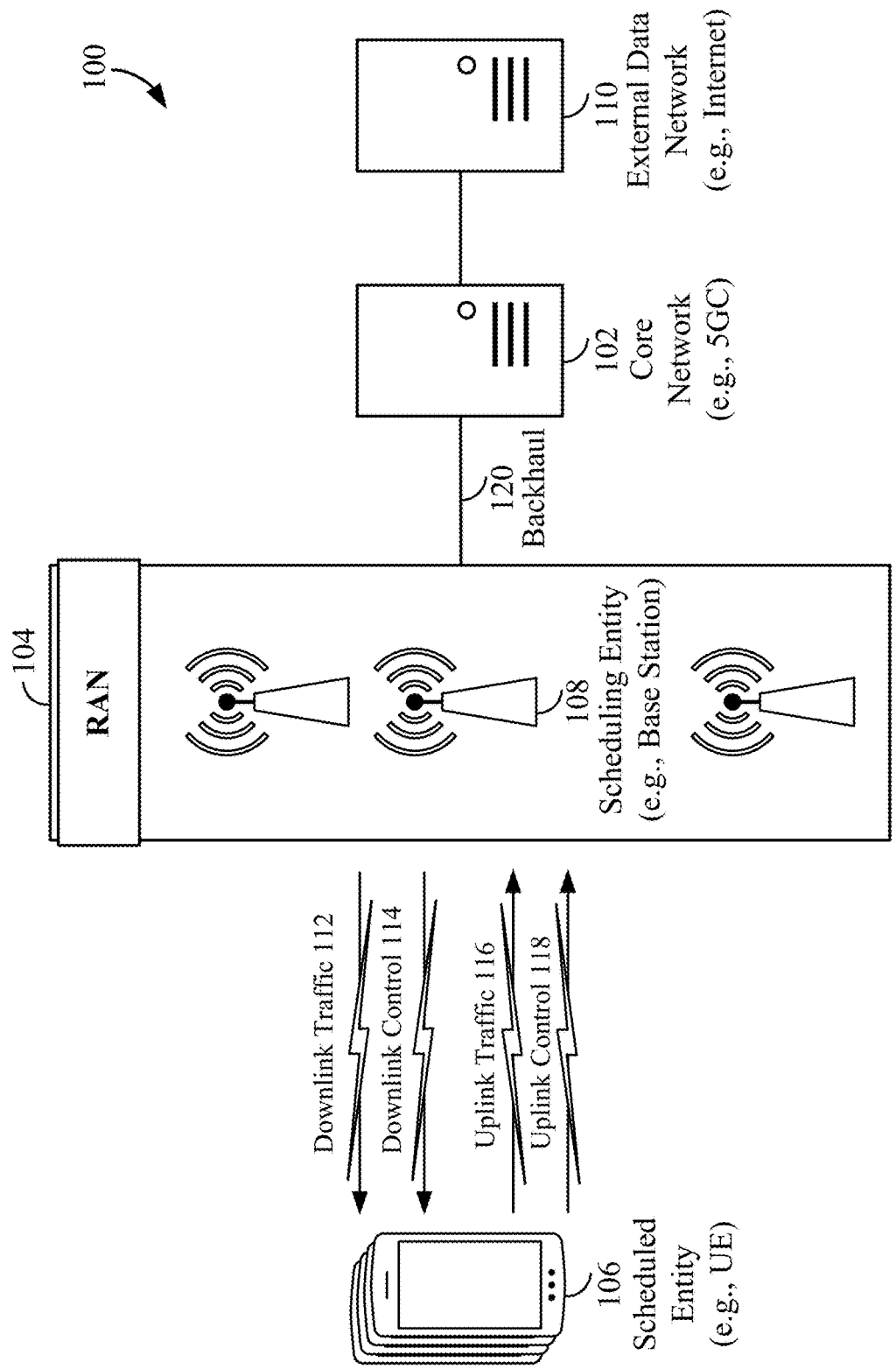
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

A UE may be capable of communicating using multiple subscriptions. For example, a UE may include multiple subscriber identity modules (SIMs) that may be used to perform wireless communication using multiple subscriptions, respectively. However, using multiple subscriptions to establish connections via a common communication link has not been developed.

According to aspects of the disclosure, the UE may establish multiple connections with the base station using multiple subscriptions via a common communication link, and perform communication using the multiple connections via the common communication link. In an aspect, a first subscription may be used to establish a first connection via a common communication link when no other connection is established or active, and subsequently another subscription (e.g., second subscription) may be used to establish another connection via the common communication link, e.g., when the first connection established is active. By enabling connections of multiple subscriptions over a single communication link, communication using multiple subscriptions may be achieved in a more simpler manner than communication using multiple communication links. For example, using multiple communication links for multiple subscriptions may require dividing resources for the multiple communication links and/or balancing use of antennas among the multiple communication links, which is not needed when using a single communication link for connections of multiple subscriptions.

To establish the first connection using the first subscription, an RRC setup procedure and a RACH procedure for the first connection may be performed between the UE and the base station. Once the first connection is established, the second connection using the second subscription may be established by performing an RRC setup procedure for the second connection, without performing a RACH procedure to reduce any latency in establishing the second connection. In an aspect, a media access control (MAC) layer and a physical layer (PHY) of a protocol stack of the UE may be shared by the multiple subscriptions for the common communication link, while each of the multiple subscriptions may utilize its own layers for the other layers in the protocol stack of the UE. In an aspect, a MAC layer and a PHY layer of a protocol stack of the base station may be shared by the multiple subscriptions for the common communication link, while each of the multiple subscriptions may utilize its own layers for the other layers in the protocol stack of the base station.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, radio frequency (RF) chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
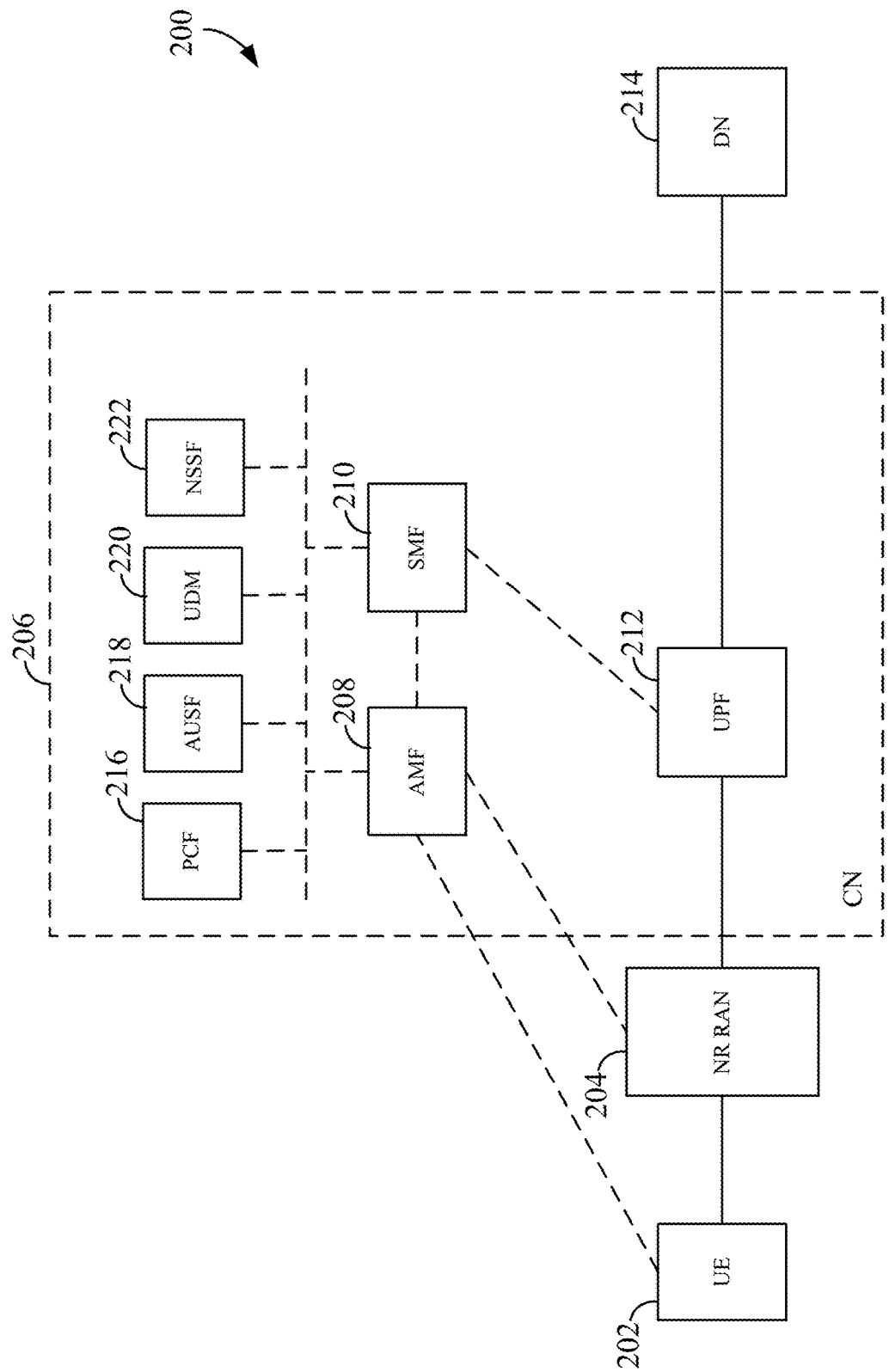
FIG. 2 is a block diagram illustrating an example of a 5G wireless communication system (5GS).

Referring now to FIG. 2, by way of example and without limitation, a block diagram illustrating an example of various components of a 5G wireless communication system (5GS) 200 is provided. In some examples, the 5GS 200 may be the same wireless communication system 100 described above and illustrated in FIG. 1. The 5GS 200 includes a user equipment (UE) 202, a NR RAN 204, and a core network 206. By virtue of the wireless communication system 200, the UE 202 may be enabled to carry out data communication with an external data network 214, such as (but not limited to) the Internet, Ethernet network, an internet protocol (IP) multimedia subsystem (IMS) network, or a local area network.

The core network 206 may include, for example, an access and mobility management function (AMF) 208, a session management function (SMF) 210, and a user plane function (UPF) 212. The AMF 208 and SMF 210 employ control plane (e.g., Non Access Stratum (NAS)) signaling to perform various functions related to mobility management and session management for the UE 202. For example, the AMF 208 provides connectivity, mobility management and authentication of the UE 202, while the SMF 210 provides session management of the UE 202 (e.g., processes signaling related to protocol data unit (PDU) sessions between the UE 202 and the external DN 214). The UPF 212 provides user plane connectivity to route 5G (NR) packets to/from the UE 202 via the NR RAN 204.

The core network 206 may further include other functions, such as a policy control function (PCF) 216, authentication server function (AUSF) 218, unified data management (UDM) 220, network slice selection function (NSSF) 222, and other functions (not illustrated, for simplicity). The PCF 216 provides policy information (e.g., rules) for control plane functions, such as network slicing, roaming, and mobility management. In addition, the PCF 216 supports 5G quality of service (QoS) policies, network slice policies, and other types of policies. The AUSF 218 performs authentication of UEs 202. The UDM 220 facilitates generation of authentication and key agreement (AKA) credentials, performs user identification and manages subscription information and UE context. In some examples, the AMF 208 includes a co-located security anchor function (SEAF) that allows for re-authentication of a UE 202 when the UE moves between different NR RANs 204 without having to perform a complete authentication process with the AUSF 218. The NSSF 222 redirects traffic to a network slice. Network slices may be defined, for example, for different classes of subscribers or use cases, such as smart home, Internet of Things (IoT), connected car, smart energy grid, etc. Each use case may receive a unique set of optimized resources and network topology (e.g., a network slice) to meet the connectivity, speed, power, and capacity requirements of the use case.

To establish a connection to the 5G core network 206 via the NR RAN 204, the UE 202 may transmit a registration request and PDU session establishment request to the 5G core network 206 via the NR RAN 204. The AMF 208 and SMF 210 may process the registration request and PDU session establishment request and establish a PDU session between the UE 202 and the external DN 214 via the UPF 212. A PDU session may include one or more sessions (e.g., data sessions or data flows) and may be served by multiple UPFs 212 (only one of which is shown for convenience). Examples of data flows include, but are not limited to, IP flows, Ethernet flows and unstructured data flows.

Figure 3:
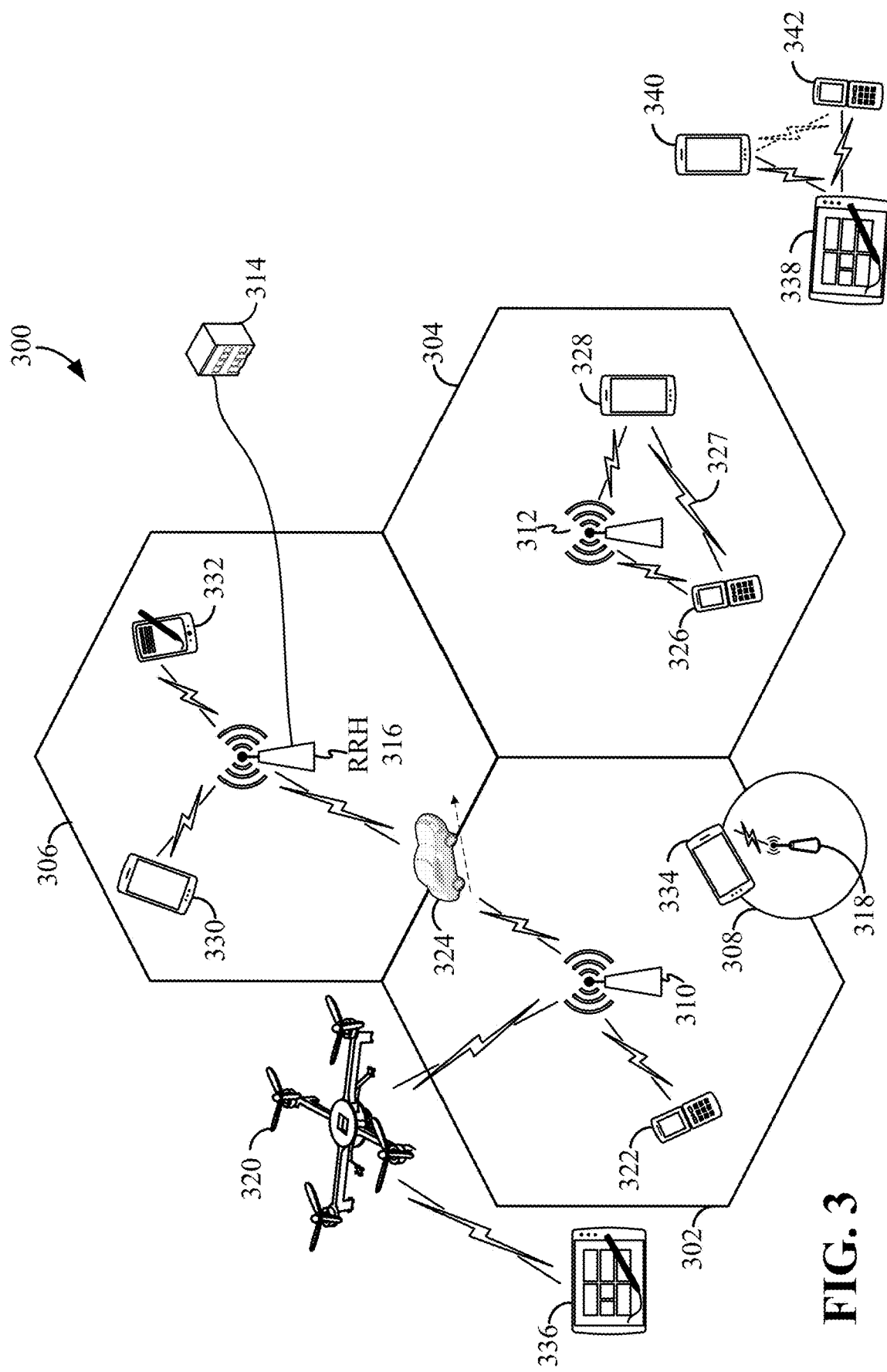
FIG. 3 is a conceptual illustration of an example of a radio access network according to some aspects.

Referring now to FIG. 3, by way of example and without limitation, a schematic illustration of a RAN 300 is provided. In some examples, the RAN 300 may be the same as the RAN 104 described above and illustrated in FIG. 1 and/or the NR RAN 204 described above and illustrated in FIG. 2. The geographic area covered by the RAN 300 may be divided into cellular regions (cells) that can be uniquely identified by a user equipment (UE) based on an identification broadcasted from one access point or base station. FIG. 3 illustrates macrocells 302, 304, and 306, and a small cell 308, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 3, two base stations 310 and 312 are shown in cells 302 and 304; and a third base station 314 is shown controlling a remote radio head (RRH) 316 in cell 306. That is, a base station can have an integrated antenna or can be connected to an antenna or RRH by feeder cables. In the illustrated example, the cells 302, 304, and 126 may be referred to as macrocells, as the base stations 310, 312, and 314 support cells having a large size. Further, a base station 318 is shown in the small cell 308 (e.g., a microcell, picocell, femtocell, home base station, home Node B, home eNode B, etc.) which may overlap with one or more macrocells. In this example, the cell 308 may be referred to as a small cell, as the base station 318 supports a cell having a relatively small size. Cell sizing can be done according to system design as well as component constraints.

It is to be understood that the radio access network 300 may include any number of wireless base stations and cells. Further, a relay node may be deployed to extend the size or coverage area of a given cell. The base stations 310, 312, 314, 318 provide wireless access points to a core network for any number of mobile apparatuses. In some examples, the base stations 310, 312, 314, and/or 318 may be the same as the base station/scheduling entity 108 described above and illustrated in FIG. 1.

FIG. 3 further includes a quadcopter or drone 320, which may be configured to function as a base station. That is, in some examples, a cell may not necessarily be stationary, and the geographic area of the cell may move according to the location of a mobile base station such as the quadcopter 320.

Within the RAN 300, the cells may include UEs that may be in communication with one or more sectors of each cell. Further, each base station 310, 312, 314, 318, and 320 may be configured to provide an access point to a core network 102 (see FIG. 1) for all the UEs in the respective cells. For example, UEs 322 and 324 may be in communication with base station 310; UEs 326 and 328 may be in communication with base station 312; UEs 330 and 332 may be in communication with base station 314 by way of RRH 316; UE 334 may be in communication with base station 318; and UE 336 may be in communication with mobile base station 320. In some examples, the UEs 322, 324, 326, 328, 330, 332, 334, 336, 338, 340, and/or 342 may be the same as the UE/scheduled entity 106 described above and illustrated in FIG. 1.

In some examples, a mobile network node (e.g., quadcopter 320) may be configured to function as a UE. For example, the quadcopter 320 may operate within cell 302 by communicating with base station 310.

In a further aspect of the RAN 300, sidelink signals may be used between UEs without necessarily relying on scheduling or control information from a base station. For example, two or more UEs (e.g., UEs 326 and 328) may communicate with each other using peer to peer (P2P) or sidelink signals 327 without relaying that communication through a base station (e.g., base station 312). In a further example, a UE 338 is illustrated communicating with UEs 340 and 342. Here, the UE 338 may function as a scheduling entity or a primary sidelink device, and UEs 340 and 342 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 340 and 342 may optionally communicate directly with one another in addition to communicating with the UE 338 functioning as the scheduling entity. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 300, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 300 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 324 (illustrated as a vehicle, although any suitable form of UE may be used) may move from the geographic area corresponding to its serving cell 302 to the geographic area corresponding to a neighbor cell 306. When the signal strength or quality from the neighbor cell 306 exceeds that of its serving cell 302 for a given amount of time, the UE 324 may transmit a reporting message to its serving base station 310 indicating this condition. In response, the UE 324 may receive a handover command, and the UE may undergo a handover to the cell 306.

In a network configured for UL-based mobility, UL reference signals from each UE may be utilized by the network to select a serving cell for each UE. In some examples, the base stations 310, 312, and 314/216 may broadcast unified synchronization signals (e.g., unified Primary Synchronization Signals (PSSs), unified Secondary Synchronization Signals (SSSs) and unified Physical Broadcast Channels (PBCH)). The UEs 322, 324, 326, 328, 330, and 332 may receive the unified synchronization signals, derive the carrier frequency and slot timing from the synchronization signals, and in response to deriving timing, transmit an uplink pilot or reference signal. The uplink pilot signal transmitted by a UE (e.g., UE 324) may be concurrently received by two or more cells (e.g., base stations 310 and 314/216) within the radio access network 300. Each of the cells may measure a strength of the pilot signal, and the radio access network (e.g., one or more of the base stations 310 and 314/216 and/or a central node within the core network) may determine a serving cell for the UE 324. As the UE 324 moves through the radio access network 300, the network may continue to monitor the uplink pilot signal transmitted by the UE 324. When the signal strength or quality of the pilot signal measured by a neighboring cell exceeds that of the signal strength or quality measured by the serving cell, the network 300 may handover the UE 324 from the serving cell to the neighboring cell, with or without informing the UE 324.

Although the synchronization signal transmitted by the base stations 310, 312, and 314/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 300 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 4:
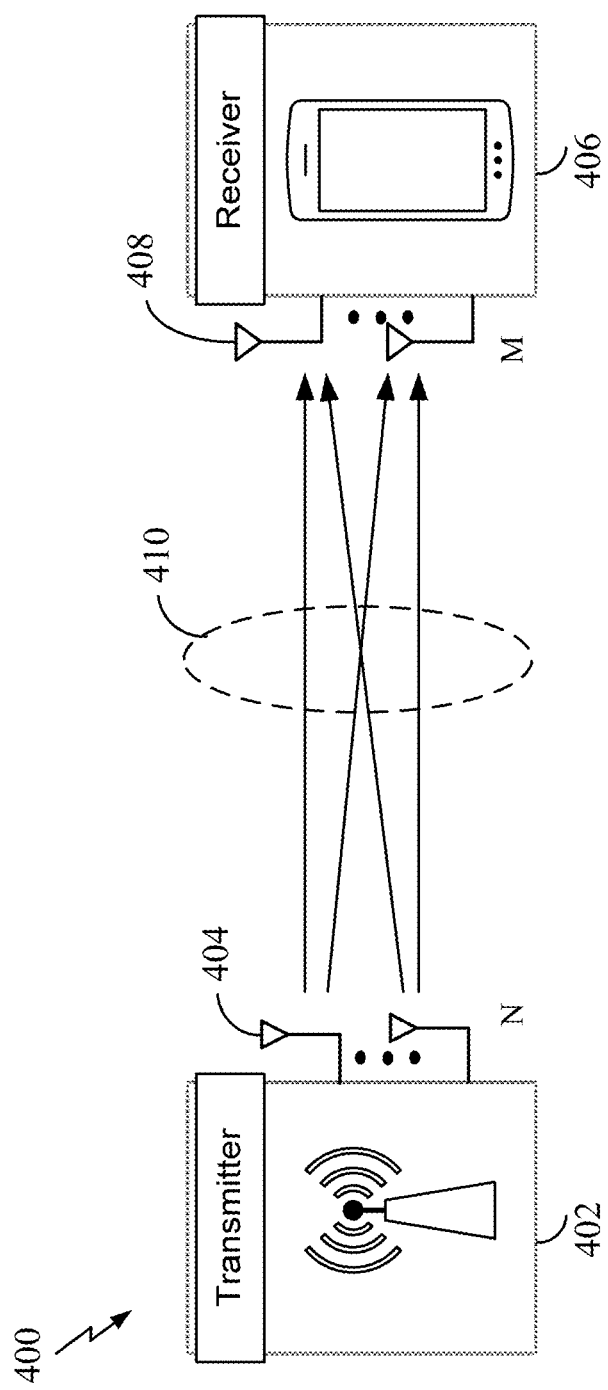
FIG. 4 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 4 illustrates an example of a wireless communication system 400 supporting MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the channel quality indicator (CQI) and RI values to the base station for use in updating the rank and assigning REs for future downlink transmissions.

In the simplest case, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

A UE may communicate with a service network using a subscription for a service (e.g., data service, voice service) provided by the service network. The UE may implement a subscription module such as a subscriber identity module (SIM) to connect to the service network. A UE may be configured to communicate using two or more subscriptions. For example, a UE implementing multiple SIMs respectively associated with multiple subscriptions may communicate using the multiple subscriptions via the multiple SIMs. The UE may establish communication links using the multiple subscriptions to perform communication using the multiple subscriptions. The communication links may be established with a common base station. For example, for a UE with two SIMs having a dual SIM, dual active (DSDA) capability, two SIMs may stay connected (or active) simultaneously with a network and thus may be used to perform communication simultaneously. In another example, for a UE with two SIMs having a dual SIM, dual standby (DSDS) capability, while one SIM is used to actively perform communication, the other SIM is placed on standby.

In a case where the UE connects with the same base station using multiple subscriptions, ways to utilize a communication link to connect to the base station using multiple subscriptions have not been explored. For example, it may be beneficial to have available approaches for connection establishment and/or communication via a single communication link using multiple subscriptions.

According to some aspects of the disclosure, a UE may establish multiple connections with a base station using multiple subscriptions (e.g., respectively associated with multiple SIMS) via a common communication link, and perform communication with the base station via the common communication link using multiple subscriptions. The communication link may be common to the multiple connections respectively using the multiple subscriptions, and thus may be shared by the multiple subscriptions. For example, if the multiple subscriptions include a first subscription and a second subscription, the communication link may be shared by the first subscription and the second subscription.

The multiple connections over the communication link between the UE and the base stations may be radio resource control (RRC) connections. In an aspect, a first subscription used to establish a first connection via the communication link may be used to perform a random access channel (RACH) procedure and an RRC setup procedure. After establishing the first connection, in order to establish each subsequent connection via the communication link using a respective subscription (e.g., while the first connection is active), a corresponding RRC setup procedure may be performed but a RACH procedure may not be performed. Because no RACH procedure may be performed for establishing any subsequent connection (e.g., after establishing the first connection), a latency associated with the subsequent connection establishment is reduced. The RRC setup procedure may also be referred to as an RRC connection establishment procedure.

In an aspect, lower layers in a protocol stack of a UE such as a media access control (MAC) layer and a physical layer (PHY) of the UE may be shared by the multiple subscriptions for the communication link, while each of the multiple subscriptions may utilize its own layers for the other layers in the protocol stack of the UE. In other words, a common MAC layer and a common PHY layer of the UE may be shared by multiple subscriptions, while each of the multiple subscriptions utilizes its own layers for the other layers in the protocol stack of the UE different from the common MAC layer and the common PHY layer. Hence, the same MAC layer and the same PHY layer of the UE may be used for a first communication using a first connection of the first subscription via the communication link and for a second communication using a second connection of a second subscription via the communication link. In an aspect, lower layers in a protocol stack of a base station such as a MAC layer and a PHY layer of the base station may be shared by the multiple subscriptions for the communication link, while each of the multiple subscriptions may utilize its own layers for the other layers in the protocol stack of the base station. In other words, a common MAC layer and a common PHY layer of the base station may be shared by multiple subscriptions, while each of the multiple subscriptions utilizes its own layers for the other layers in the protocol stack of the base station different from the common MAC layer and the common PHY layer. Hence, the same MAC layer and the same PHY layer of the base station may be used for the first communication using the first connection of the first subscription via the communication link and for the second communication using the second connection of a second subscription via the communication link.

In an aspect, each of the subscriptions may be associated with its own security instances for communication. For example, a packet data convergence protocol (PDCP) layer for signaling radio bearers (SRBs) and dedicated radio bearers (DRBs) for a particular subscription may have a security key for the particular subscription at an access stratum (AS). In an aspect, the connections using the multiple subscriptions via a single communication link may be established in any order. For example, a first connection using the first subscription via a communication link may be established either before or after establishing a second connection using the second subscription via the communication link. In an aspect, a connection via a single communication link using one subscription may become idle without interrupting another connection via the single communication link using another subscription, regardless of which connection was established first. For example, if a first RRC connection associated with a first subscription (e.g., via the first SIM) becomes idle, RRC signaling using a second RRC connection associated with a second subscription (e.g., via the second SIM) continues without interruption, regardless of whether the first RRC connection is established first or the second RRC connection is established first. In an aspect, for each of the subscriptions, a serving temporary mobile subscriber identity (S-TMSI) may be assigned to the NAS instances and may not be associated with the same AMF instance as other subscriptions.

Figure 5:
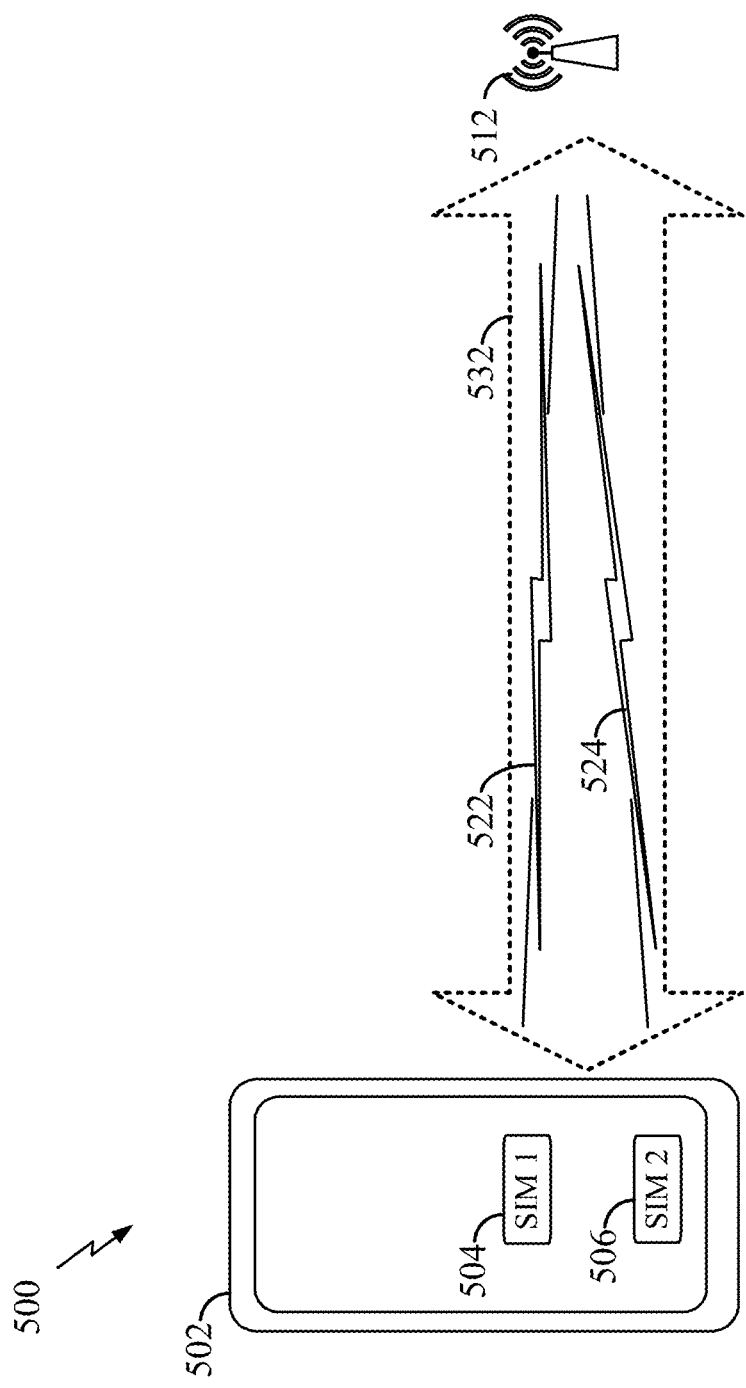
FIG. 5 is an example diagram illustrating connections between a user equipment (UE) and a base station via a single communication link using multiple subscriptions, according to an aspect of the disclosure.

FIG. 5 is an example diagram 500 illustrating connections between a UE and a base station via a single communication link using multiple subscriptions, according to an aspect of the disclosure. In FIG. 5, a UE 502 includes two SIMs, a first SIM 504 associated with a first subscription and a second SIM 506 associated with a second subscription. For illustrative purposes, a dual SIM case with the first SIM 504 and the second SIM 506 is shown and explained. However, it is understood that the disclosure is not limited to a UE with two SIMs, and more than two SIMs for more than two subscriptions may be used. In FIG. 5, the UE 502 utilizes the first SIM 504 to establish a first connection 522 via a communication link 532 with a base station 512 using the first subscription. The UE 502 also utilizes the second SIM 506 to establish a second connection 524 via the communication link 532 with the base station 512 using the second subscription. Hence, the first connection 522 using the first subscription and the second connection 524 using the second subscription may share the communication link 532.

As discussed above, one of the first connection 522 or the second connection 524 may be established first, before establishing the other one of the first connection 522 or the second connection 524. For example, if the first connection 522 is established first, the UE 502 may establish the first connection 522 by performing a RACH procedure and a first RRC setup procedure with the base station 512 using the first SIM 504 associated with the first subscription, and then may establish the second connection 524 by performing a second RRC setup procedure with the base station 512 using the second SIM 506 associated with the second subscription (e.g., without a RACH procedure for the second connection 524). In this example, when establishing the second connection 524, a RACH procedure may not be performed, at least because the communication link 532 is common for both the first and second subscriptions and the RACH procedure is already performed when establishing the first connection 522 using the first SIM 504.

In an aspect, RRC signaling for each of the multiple subscriptions may be performed separately over a respective RRC connection. For example, the first SIM 504 may perform RRC signaling via the first connection 522 over the communication link 532, and the second SIM 506 may perform RRC signaling via the second connection 524 over the communication link 534. In an aspect, a separate SRB may be set up for each SIM. For example, security for the RRC signaling for each SIM may be derived from a corresponding NAS security.

Figure 6:
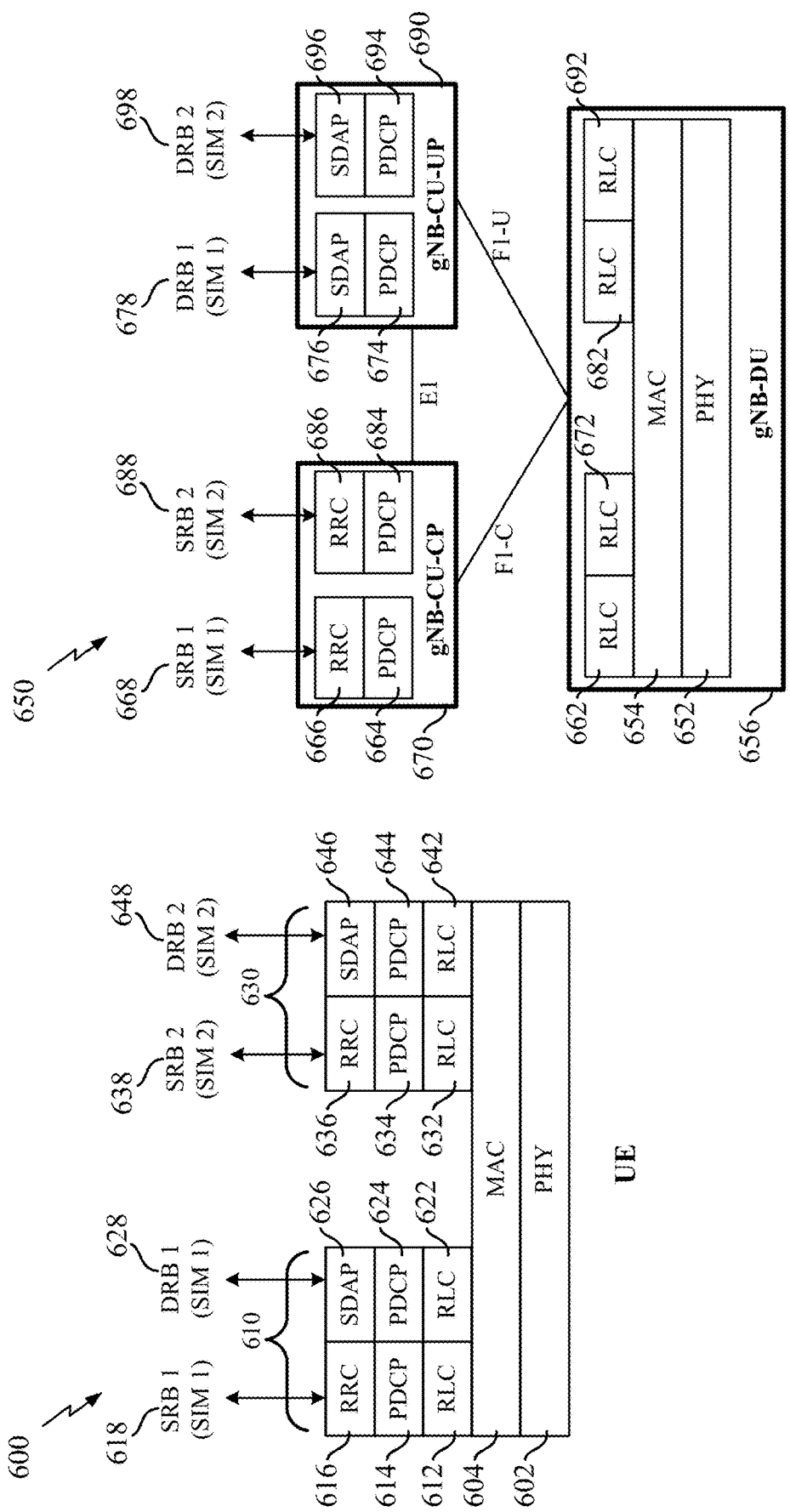
FIGS. 6A and 6B are example diagrams illustrating protocol stacks of a UE and a base station, where two connections using two subscriptions via a single communication link are established between the UE and the base station, according to an aspect of the disclosure.

FIGS. 6A and 6B are example diagrams illustrating protocol stacks of a UE and a base station, where two connections using two subscriptions via a single communication link are established between the UE and the base station, according to an aspect of the disclosure. FIG. 6A is an example diagram 600 illustrating a protocol stack of the UE, according to an aspect of the disclosure. As shown in FIG. 6A, the protocol stack of the UE (e.g., UE 502) includes a PHY layer 602 and a MAC layer 604 shared by a first SIM/first subscription and a second SIM/second subscription. Thus, the first SIM/first subscription may utilize the PHY layer 602 and the MAC layer 604 to perform a first communication over the communication link, and the second SIM/second subscription may also utilize the PHY layer 602 and the MAC layer 604 to perform a second communication over the communication link Above the MAC layer 604, the protocol stack of the UE also includes first upper layers 610 utilized by the first SIM/first subscription and second upper layers 630 utilized by the second SIM/second subscriptions. Hence, layers above the MAC layer 604 in the UE's protocol stack are not shared by the first SIM/first subscription and the second SIM/second subscription, but instead include the first upper layers 610 utilized by the first SIM/first subscription to perform the first communication over the communication link and the second upper layers 630 utilized by the second SIM/second subscription to perform the second communication over the communication link.

In FIG. 6A, the first upper layers 610 may include a first set of the first upper layers 610 for a first SRB 618 and a second set of the first upper layers 610 for a first DRB 628, where the first SRB 618 and the first DRB 628 are utilized by the first SIM/first subscription. In particular, the first set of the first upper layers 610 for the first SRB 618 may include a first RLC layer 612 of the first upper layers 610, a first PDCP layer 614 of the first upper layers 610, and a first RRC layer 616. The second set of the first upper layers 610 for the first DRB 628 may include a second RLC layer 622 of the first upper layers 610, a second PDCP layer 624 of the first upper layers 610, and a first service data adaptation protocol (SDAP) layer 626.

In FIG. 6A, the second upper layers 630 may include a first set of the second upper layers 630 for a second SRB 638 and a second set of second upper layers 630 for a second DRB 648, where the second SRB 638 and the second DRB 648 are utilized by the second SIM/second subscription. In particular, the first set of the second upper layers 630 for the second SRB 638 may include a first RLC layer 632 of the second upper layers 630, a first PDCP layer 634 of the second upper layers 630, and a second RRC layer 636. The second set of the second upper layers 630 for the second DRB 648 may include a second RLC layer 642 of the second upper layers 630, a second PDCP layer 644 of the second upper layers 630, and a second SDAP layer 646.

FIG. 6B is an example diagram 650 illustrating a protocol stack of the base station, according to an aspect of the disclosure. The base station may be a gNB including a gNB distributed unit (gNB-DU) 656, a gNB centralized unit control plane (a gNB-CU-CP) 670, and a gNB centralized unit user plane (gNB-CU-UP) 690. The gNB-DU 656 may communicate with the gNB-CU-CP 670 for SRBs via an F1-C interface and may communicate with the gNB-CU-UP 690 for DRBs via an F1-U interface. The gNB-CU-CP 670 for SRBs and the gNB-CU-UP 690 for DRBs may communicate with each other via an E1 interface. The protocol stack of the base station may include a PHY layer 652 and a MAC layer 654 that are shared by the first SIM/first subscription and the second SIM/second subscription. Thus, the first SIM/first subscription may rely on the PHY layer 652 and the MAC layer 654 to perform a first communication over the communication link, and the second SIM/second subscription may also rely on the PHY layer 652 and the MAC layer 654 to perform a second communication over the communication link Above the MAC layer 654, the protocol stack of the base station also includes first upper layers utilized by the first SIM/first subscription to perform the first communication over the communication link and second upper layers utilized by the second SIM/second subscriptions to perform the second communication over the communication link, where the first layers and the second upper layers are not shared by the first SIM/first subscription and the second SIM/second subscription.

In FIG. 6B, the first upper layers in the protocol stack of the base station may include a first set of the first upper layers for a first SRB 668 and a second set of second upper layers a first DRB 678. The first SRB 668 and the first DRB 678 may respectively be equivalent to the first SRB 618 and the first DRB 628 utilized by the first SIM/first subscription. In particular, the first set of the first upper layers for the first SRB 668 may include a first RLC layer 662 of the first upper layers, a first PDCP layer 664 of the first upper layers, and a first RRC layer 666. The second set of the first upper layers for the first DRB 678 may include a second RLC layer 672 of the first upper layers, a second PDCP layer 674 of the first upper layers, and a first SDAP layer 676.

In FIG. 6B, the second upper layers in the protocol stack of the base station may include a first set of the second upper layers for a second SRB 688 and a second set of second upper layers for a second DRB 698, where the second SRB 688 and the second DRB 698 are utilized by the second SIM/second subscription. In particular, the first set of the second upper layers for the second SRB 688 may include a first RLC layer 682 of the second upper layers, a first PDCP layer 684 of the second upper layers, and a second RRC layer 686. The second set of the second upper layers for the second DRB 698 may include a second RLC layer 692 of the second upper layers, a second PDCP layer 694 of the second upper layers, and a second SDAP layer 696. The second SRB 688 and the second DRB 698 may respectively be equivalent to the second SRB 638 and the second DRB 648 utilized by the second SIM/second subscription.

As shown in FIG. 6B, the gNB-DU 656 may include the PHY layer 652, the MAC layer 654, the first RLC layer 662 of the first upper layers, the second RLC layer 672 of the first upper layers, the first RLC layer 682 of the second upper layers, and the second RLC layer 692 of the second upper layers. The gNB-CU-CP 670 for SRBs may include the first PDCP layer 664 of the first upper layers and the first RRC layer 666 associated with the first SRB 668 and may further include the first PDCP layer 684 of the second upper layers and the second RRC layer 686 associated with the second SRB 688. The gNB-CU-UP 690 for DRBs may include the second PDCP layer 674 of the first upper layers and the first SDAP layer 676 associated with the first DRB 678, and may further include the second PDCP layer 694 of the second upper layers and the second SDAP layer 696 associated with the second DRB 698.

As discussed above, for each SIM/subscription, one or more SRBs may be set up during a corresponding RRC connection establishment. In an aspect, the one or more SRBs may include a set of SRBs including an SRB1, an SRB2, an SRB3, etc. The SRB1 may be used for RRC messages, which may include a piggybacked NAS message, as well as for NAS messages prior to establishment of the SRB2, all using a dedicated control channel (DCCH) logical channel. The SRB2 may be used for NAS messages and for RRC messages that may include logged measurement information, all using a DCCH logical channel. The SRB2 may have a lower priority than the SRB1 and may be configured by the network after an access stratum (AS) security activation. The SRB3 may be used for specific RRC messages when UE is in E-UTRAN New Radio-Dual Connectivity (EN-DC) or New Radio-Dual Connectivity (NR-DC), all using a DCCH logical channel.

In an example, when a first (RRC) connection is set up for the first subscription, the SRBs and an RRC context for the first subscription may be established. If a second (RRC) connection is set up over the same communication link after the first connection is set up, the SRBs and an RRC context for the second subscription may be established.

In an aspect, the following connection establishment procedure may be performed to establish a first connection using a first SIM/first subscription via a communication link when no other connection using another subscription has been established over the communication link. For example, in a dual SIM case, it may be assumed that establishment of the first connection using the first SIM/first subscription is performed when the first SIM/first subscription and the second SIM/second subscription are both idle. As discussed above, because no other connection has been established, the UE and the base station may perform a RACH procedure using the first SIM/first subscription via the communication link before performing a first RRC connection procedure using the first SIM/first subscription. As a part of the RACH procedure, a cell radio network temporary identifier (C-RNTI) may be assigned to the UE.

The UE may initiate an RRC connection establishment procedure by transmitting an RRC setup request to the base station, where the RRC setup request may include a first subscriber identity to indicate that the RRC connection establishment procedure is for the first subscription. The first subscriber identity may be a first S-TMSI associated with the first SIM/first subscription. During the RRC connection establishment procedure, an SRB (e.g., SRB 1) may be set up, and configurations for a PHY layer and a MAC layer for the UE and the base station may be provided.

In addition, during the RRC connection establishment procedure, an AS security context may be established based on security credentials of SIM1. Further, UE radio access capabilities transfer may be performed, which may be performed when the UE performs registration with the network. The UE and the base station may also perform an RRC reconfiguration procedure, during which an additional SRB (e.g., SRB2) and an DRB may be set up and a measurement may be configured.

In an aspect, during the RRC connection establishment procedure, each RRC message communicated between a gNB-DU and a gNB-CU-CP may contain an SRB identifier (ID) field to indicate which SRB the RRC message belongs to. The RRC messages may include an UL RRC message and a DL RRC message and may be communicated between a distributed unit (e.g., gNB-DU) and a control plane of a centralized unit (e.g., gNB-CU-CP) of the base station. In an aspect, each RRC message may include a UE indicator indicating which UE the RRC message is associated with.

In an aspect, when multiple subscriptions are used to communicate over the same communication link, an RRC message during the RRC connection establishment procedure may be communicated in such a way to indicate which subscription/SIM the RRC message is associated with. In this aspect, during the RRC connection establishment using a particular subscription, the base station may receive a subscriber identity associated with the particular subscription, such that the base station may mange communication of RRC messages between a distributed unit (e.g., gNB-DU) of the base station and a control plane of a centralized unit (e.g., gNB-CU-CP) of the base station based on the subscriber identity (e.g., to distinguish an RRC message for the particular subscription from an RRC message for another subscription). For example, in a dual SIM case, during a first RRC connection establishment procedure, the base station may receive a first subscriber identity associated with the first subscription and manage communication of first RRC messages associated with the first subscription between the distributed unit and the control plane of the centralized unit of the base station based on the first subscriber identity. In this example, during a second RRC connection establishment procedure, the base station may further receive a second subscriber identity associated with the second subscription and manage communication of second RRC messages associated with the second subscription between the distributed unit and the control plane of the centralized unit of the base station based on the second subscriber identity. In an aspect, the subscriber identity may be an S-TMSI identifying a particular SIM/subscription.

The base station may manage communication of the RRC messages according to one or more of the following approaches, in order to distinguish an RRC message for a particular subscription from an RRC message for another subscription. According to a first approach, each RRC message may include a subscription ID that indicates which subscription/SIM the RRC message is associated with, where the subscription ID may be generated based on the subscriber identity received from the UE. For example, in the dual SIM case, the first RRC messages associated with the first subscription may include a first subscription ID associated with the first subscription based on the first subscriber identity, and the second RRC messages associated with the first subscription may include a second subscription ID associated with the second subscription based on the second subscriber identity. In an example, the subscription ID may be a set of indices.

According to a second approach, RRC messages for different SIMs/subscriptions may be communicated over different UE-associated logical connections on the F1-C (e.g., F1-AP) interface in the base station (e.g., gNB) between the distributed unit (e.g., gNB-DU) and the control plane of the centralized unit (e.g., gNB-CU-CP) of the base station. Hence, different UE-associated logical connections may be set up to exchange RRC messages for different SIMs/subscriptions on the F1-C interface. For example, in the dual SIM case, on the F1-C interface in the base station, a first UE-associated logical connection associated with the first subscription may be used to communicate the first RRC messages associated with the first subscription, and a second UE-associated logical connection associated with the second subscription may be used to communicate the second RRC messages associated with the second subscription. In an aspect, a correlation ID may be used in the RRC messages to indicate that these UE-associated logical connections are for the same UE, to distinguish these UE-associated logical connections from other UE-associated logical connections for another UE communicating with the base station.

According to a third approach, separate control panels of a centralized unit (CU-CPs) of the base station may be established for different SIMs/subscriptions. In the third approach, separate UE-associated logical connections may be set up for the different SIMs/subscriptions on the F1-C interface between the CU-CPs of the base station and the distributed unit of the base station. In an aspect, each of the CU-CPs of the base station may include an RRC layer associated with a corresponding SIM/subscription. For example, in the dual SIM case, a first CU-CP associated with the first subscription and a second CU-CP associate with the second subscription may be established in the base station, and the first RRC messages associated with the first subscription may be communicated with the first CU-CP of the base station, and the second RRC messages associated with the second subscription may be communicated with the second CU-CP of the base station.

According to a fourth approach, different SRB IDs may be assigned to different SIMs/subscriptions for different RRC messages associated with different SIMs/subscriptions, where each SRB ID may indicate a different type of SRB. As such, for an RRC message associated with a particular SIM/subscription, an SRB ID in the RRC message may indicate the particular SIM/subscription. For example, SRB1 and SRB2 may be assigned to the first SIM/first subscription, and SRB5 and SRB6 may be assigned to the second SIM/second subscription. For example, in the dual SIM case, the first RRC messages associated with the first subscription may include one or more first SRB IDs associated with the first subscription, and second RRC messages may include one or more second SRB IDs associated with the second subscription.

Figure 7:
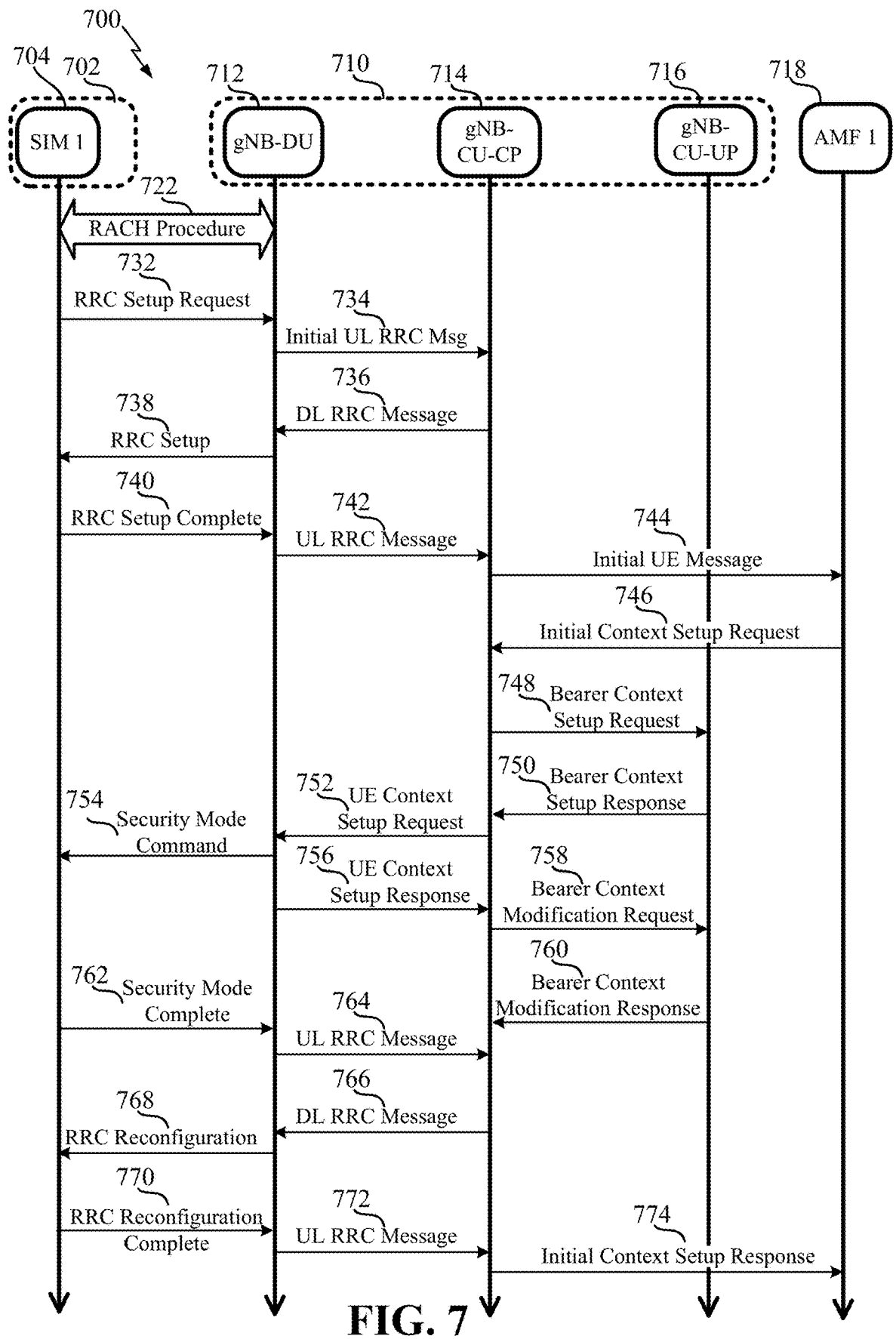
FIG. 7 is a flow diagram illustrating a process to establish a first radio resource control (RRC) connection between a UE and a base station using a first subscription of the UE via a communication link, according to an aspect of the disclosure.

FIG. 7 is a flow diagram 700 illustrating a process to establish a first RRC connection between a UE and a base station using a first subscription of the UE via a communication link, according to an aspect of the disclosure. The process in FIG. 7 may be performed using a UE 702 having a first SIM (SIM 1) 704 associated with a first subscription, a gNB-DU 712, a gNB-CU-CP 714, a gNB-CU-UP 716, and a first AMF 718 associated with the first subscription. In an aspect, the UE 702 may further include another SIM associated with another subscription. The gNB-DU 712, the gNB-CU-CP 714, and the gNB-CU-UP 716 may be included in a gNB 710, which is the base station.

The process in FIG. 7 may take place when no RRC connection has been established or is active between the UE (e.g., UE 702) and the base station (e.g., gNB 710) using any subscription via the communication link Hence, at first, the UE 702 and the gNB-DU 722 may perform a RACH procedure at 722, using the first SIM 704 associated with the first subscription. During the RACH procedure, a first C-RNTI may be assigned to the UE for the first RRC connection, such that one or more messages to the UE 702 may be addressed to the first C-RNTI while establishing the first RRC connection.

After the RACH procedure at 722 is complete, the UE 702 may perform a first RRC connection establishment procedure to establish the first RRC connection via the communication link using the first SIM 704. In particular, at 732, the UE 702 transmits an RRC setup request to the gNB-DU 712, where the RRC setup request may include a first S-TMSI associated with the first SIM 704/first subscription. The RRC setup request may be transmitted over an SRB0 of the first RRC connection, where a message such as the RRC setup request over the SRB0 may carry subscriber identity such as an S-TMSI to indicate which SIM/subscription the messages are associated with. At 734, the gNB-DU 712 sends an initial UL RRC message to the gNB-CU-CP 714, where the initial UL RRC message may include a gNB-DU UE F1-AP ID, a gNB-CU UE F1-AP ID, and a C-RNTI (e.g., first C-RNTI) allocated by the gNB-DU 712, and may further contain the RRC setup request from the first SIM 704, SRB1 RLC, and an LC configuration. At 736, the gNB-CU-CP 714 sends a DL RRC message to the gNB-DU 712, where the DL RRC message may include the gNB-DU UE F1-AP ID, the gNB-CU UE F1-AP ID, and an SRB ID, and may also contain an RRC Setup message. The SRB ID in the DL RRC message may indicate the SRB0 of the first RRC connection.

At 738, the gNB-DU 712 forwards the RRC Setup message to the UE 702, which may be received using the first SIM 704, where the RRC setup message may include a SIM 1 SRB 1 configuration. When the RRC Setup is complete, at 740, the UE 702 transmits the RRC setup complete message to the gNB-DU 712 (e.g., using the first SIM 704), where the RRC setup complete message may include a UE NAS message. At 742, the gNB-DU 712 sends a UL RRC message to the gNB-CU-CP 714, where the UL RRC message may include the gNB-DU UE F1-AP ID, the gNB-CU UE F1-AP ID, and the SRB ID, and may further include the RRC setup complete message. The SRB ID in the UL RRC message may indicate an SRB1 of the first RRC connection.

At 744, the gNB-CU-CP 714 sends an initial UE message to the first AMF 718. At 746, the gNB-CU-CP 714 receives an initial context setup request from the first AMF 718, where the initial context setup request may include UE radio access capabilities and a PDU session setup request list.

At 748, the gNB-CU-CP 714 sends a bearer context setup request to the gNB-CU-UP 716, where the bearer context setup request may include a gNB-CU-CP UE E1-AP ID, a gNB-CU-UP UE E1-AP ID, a PDU session to set up list, and may also include a DRB to set up list, and an SDAP and PDCP configurations. In response, at 750, the gNB-CU-UP 716 sends a bearer context setup response to the gNB-CU-CP 714, where the bearer context setup response may include the gNB-CU-CP UE E1-AP ID, the gNB-CU-UP UE E1-AP ID, a PDU session set up list, and a PDU session failed to set up list.

At 752, the gNB-CU-CP 714 transmits a UE context setup request to a gNB-DU 712, where the UE context setup request may include an SRB and DRB to set up list, and may further contain a security mode command. At 754, the gNB-DU 712 sends the security mode command to the UE 702, which may be received using the first SIM 704. At 756, the gNB-DU 712 also sends a UE context setup response to the gNB-CU-CP 714 (e.g., in response to the UE context setup request), where the UE context setup response may include an SRB failed list, a DRB failed list, an SRB setup list, and a DRB setup list.

At 758, the gNB-CU-CP 714 sends a bearer context modification request to the gNB-CU-UP 716, where the bearer context modification request may include a PDU session to modify list and a PDU session to remove list. In response, at 760, the gNB-CU-UP 716 sends a bearer context modification response to the gNB-CU-CP 714, where the bearer context modification response may include a PDU session modified list.

At 762, when the UE 702 completes the security mode, the UE 702 transmits a security mode complete message to the gNB-DU 712 (e.g., using the first SIM 704). At 764, the gNB-DU 712 sends a UL RRC message to the gNB-CU-CP 714, where the UL RRC message may include an SRB ID and may also contain the security mode complete message. The SRB ID in the UL RRC message may indicate the SRB1 of the first RRC connection. At 766, the gNB-CU-CP 714 sends a DL RRC message to the gNB-DU 712, where the DL RRC message may include an SRB ID and may further contain an RRC reconfiguration message. The SRB ID in the DL RRC message may indicate the SRB1 of the first RRC connection.

At 768, the gNB-DU 712 transmits the RRC reconfiguration message to the UE 702, which may be received using the first SIM 704, where the RRC reconfiguration message may include an SRB and DRB configuration and a measurement configuration. For example, configurations for one or more of an SDAP, a PDCP, an RLC and an LC may be provided via the RRC reconfiguration message, to set up an SRB (e.g., SRB2) and DRBs. At 770, when the RRC reconfiguration is complete, the UE 702 transmits an RRC reconfiguration complete message to the gNB-DU 712 (e.g., using the first SIM 704).

At 772, the gNB-DU 712 sends a UL RRC message to the gNB-CU-CP 714, where the UL RRC message may include an SRB ID and may contain the RRC reconfiguration complete message. The SRB ID in the UL RRC message may indicate an SRB2 of the first RRC connection. At 774, the gNB-CU-CP 714 transmits an initial context setup response to the first AMF 718, where the initial context setup response may include a PDU session setup response list and a PDU session failed set up list.

Figure 8:
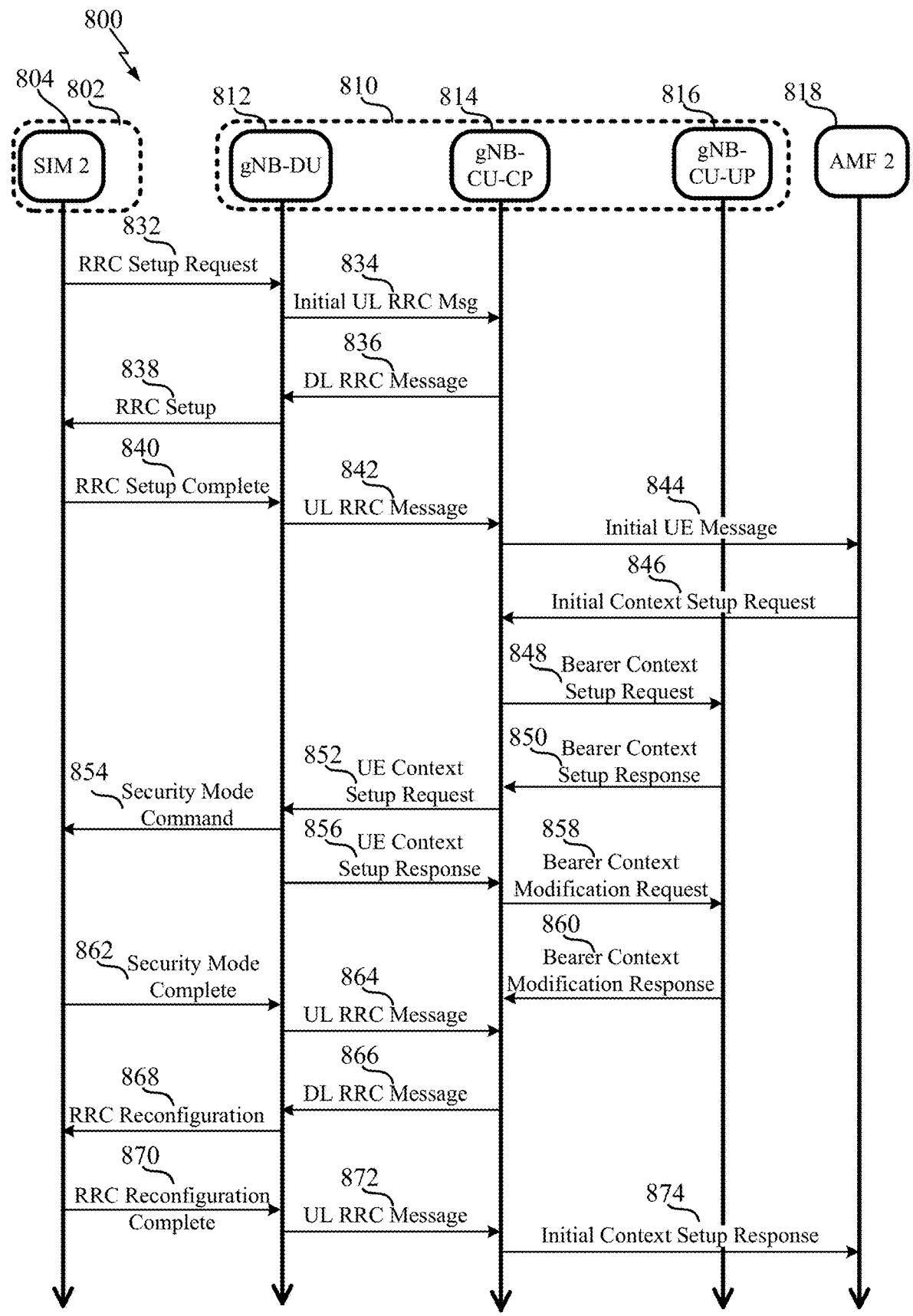
FIG. 8 is a flow diagram illustrating a process to establish a second RRC connection between the UE and the base station using a second subscription of the UE via the communication link, according to an aspect of the disclosure.

FIG. 8 is a flow diagram 800 illustrating a process to establish a second RRC connection between the UE and the base station using a second subscription of the UE via the communication link, according to an aspect of the disclosure. The process in FIG. 8 may be performed using a UE 802 having a second SIM (SIM 2) 804 associated with a second subscription, a gNB-DU 812, a gNB-CU-CP 814, a gNB-CU-UP 816, and a second AMF 818 associated with the second subscription. In an aspect, the UE 802 may further include another SIM associated with another subscription. The gNB-DU 812, the gNB-CU-CP 814, the gNB-CU-UP 816 may be included in a gNB 810, which is the base station.

In an aspect, the UE 802 may the UE 702 of FIG. 7, where the UE 802 may include the first SIM 704 and the second SIM 804, and the gNB 810 may be the gNB 710 of FIG. 7. In this aspect, the flow diagram 800 of FIG. 8 may be a continuation of the flow diagram 700 of FIG. 7. In an aspect, the gNB-DU 812, the gNB-CU-CP 814, and the gNB-CU-UP 816 may be the gNB-DU 712, the gNB-CU-CP 714, and the gNB-CU-UP 716 of FIG. 7, respectively. In another aspect, the gNB-DU 812 and the gNB-CU-UP 816 may be the gNB-DU 712 and the gNB-CU-UP 716 of FIG. 7, respectively, but the gNB-CU-CP 814 may be associated with the second subscription and thus may be different from the gNB-CU-CP 714 of FIG. 7, which may be associated with the first subscription.

The process in FIG. 8 may take place after the first RRC connection using the first subscription via the same communication link has been completed (e.g., after completion of the process in FIG. 7 to establish the first RRC connection). Because the second subscription utilizes the same communication link as the first subscription, no RACH procedure may be needed for the process to establish the second RRC connection using the second subscription.

Without performing another RACH process, the UE 802 may perform a second RRC connection establishment procedure to establish the second RRC connection via the communication link using the second SIM 804. In particular, at 832, the UE 802 transmits an RRC setup request to the gNB-DU 812, where the RRC setup request may include a second S-TMSI associated with the second SIM 804/second subscription. The RRC setup request may be transmitted over an SRB0, where a message such as the RRC setup request over the SRB0 may carry subscriber identity such as an S-TMSI to indicate which SIM/subscription the messages are associated with. In an aspect, the RRC setup request may be transmitted over the same SRB0 that was used to establish the first RRC connection before the second RRC connection procedure. In another aspect, the RRC setup request may be transmitted over a different SRB0 for the second RRC connection from an SRB0 that was used to establish the first RRC connection before the second RRC connection procedure.

At 834, the gNB-DU 812 sends an initial UL RRC message to the gNB-CU-CP 814, where the initial UL RRC message may include a gNB-DU UE F1-AP ID, a gNB-CU UE F1-AP ID, a C-RNTI (e.g., first C-RNTI) allocated by the gNB-DU 812, and may further contain the RRC setup request from the second SIM 804, SRB1 RLC, and an LC configuration. At 836, the gNB-CU-CP 814 sends a DL RRC message to the gNB-DU 812, where the DL RRC message may include the gNB-DU UE F1-AP ID, the gNB-CU UE F1-AP ID, and an SRB ID, and also contains an RRC Setup message. In an aspect, the SRB ID in the DL RRC message may indicate the SRB0 of the first RRC connection or the SRB0 of the second RRC connection.

At 838, the gNB-DU 812 forwards the RRC Setup message to the UE 802, which may be received using the second SIM 804, where the RRC setup message may include a SIM 1 SRB 1 configuration. In an aspect, the RRC setup message may be addressed to the first C-RNTI associated with the first RRC connection, as no RACH process was performed to assign a second C-RNTI to the UE for the second RRC connection. In an aspect, if the gNB 710 assigns a second C-RNTI for the second connection, the RRC setup message at 838 may include the second C-RNTI associated with the second RRC connection, such that one or more subsequent messages to the UE 802 may be addressed to the second C-RNTI.

When the RRC Setup is complete, at 840, the UE 802 transmits the RRC setup complete message to the gNB-DU 812 (e.g., using the second SIM 804), where the RRC setup complete message may include a UE NAS message. At 842, the gNB-DU 812 sends a UL RRC message to the gNB-CU-CP 814, where the UL RRC message may include the gNB-DU UE F1-AP ID, the gNB-CU UE F1-AP ID, and the SRB ID, and may further include the RRC setup complete message. In an aspect, the SRB ID in the UL RRC message may indicate an SRB1 of the second RRC connection.

At 844, the gNB-CU-CP 814 sends an initial UE message to the second AMF 818. At 846, the gNB-CU-CP 814 receives an initial context setup request from the second AMF 818, where the initial context setup request may include UE radio access capabilities and a PDU session setup request list.

At 848, the gNB-CU-CP 814 sends a bearer context setup request to the gNB-CU-UP 816, where the bearer context setup request may include a gNB-CU-CP UE E1-AP ID, a gNB-CU-UP UE E1-AP ID, a PDU session to set up list, and may also include a DRB to set up list, and an SDAP and PDCP configurations. In response, at 850, the gNB-CU-UP 816 sends a bearer context setup response to the gNB-CU-CP 814, where the bearer context setup response may include the gNB-CU-CP UE E1-AP ID, the gNB-CU-UP UE E1-AP ID, a PDU session set up list, and a PDU session failed to set up list.

At 852, the gNB-CU-CP 814 transmits a UE context setup request to a gNB-DU 812, where the UE context setup request may include an SRB and DRB to set up list, and may further contain a security mode command. At 854, the gNB-DU 812 sends the security mode command to the UE 802, which may be received using the second SIM 804. At 856, the gNB-DU 812 also sends a UE context setup response to the gNB-CU-CP 814, where the UE context setup response may include an SRB failed list, a DRB failed list, an SRB setup list, and a DRB setup list.

At 858, the gNB-CU-CP 814 sends a bearer context modification request to the gNB-CU-UP 816, where the bearer context modification request may include a PDU session to modify list and a PDU session to remove list. In response, at 860, the gNB-CU-UP 816 sends a bearer context modification response to the gNB-CU-CP 814, where the bearer context modification response may include a PDU session modified list.

At 862, when the UE 802 completes the security mode, the UE 802 transmits a security mode complete message to the gNB-DU 812 (e.g., using the second SIM 804). At 864, the gNB-DU 812 sends a UL RRC message to the gNB-CU-CP 814, where the UL RRC message may include an SRB ID and may also contain the security mode complete message. In an aspect, the SRB ID in the UL RRC message may indicate the SRB1 of the second RRC connection. At 866, the gNB-CU-CP 814 sends a DL RRC message to the gNB-DU 812, where the DL RRC message may include an SRB ID and may further contain an RRC reconfiguration message. In an aspect, the SRB ID in the DL RRC message may indicate the SRB1 of the second RRC connection.

At 868, the gNB-DU 812 transmits the RRC reconfiguration message to the UE 802, which may be received using the second SIM 804, where the RRC reconfiguration message may include an SRB and DRB configuration and a measurement configuration. For example, configurations for one or more of an SDAP, a PDCP, an RLC and an LC may be provided via the RRC reconfiguration message, to set up an SRB (e.g., SRB2) and DRBs. At 870, when the RRC reconfiguration is complete, the UE 802 transmits an RRC reconfiguration complete message to the gNB-DU 812 (e.g., using the second SIM 804).

At 872, the gNB-DU 812 sends a UL RRC message to the gNB-CU-CP 814, where the UL RRC message may include an SRB ID and may contain the RRC reconfiguration complete message. In an aspect, the SRB ID in the UL RRC message may indicate an SRB2 of the second RRC connection. At 874, the gNB-CU-CP 814 transmits an initial context setup response to the second AMF 818, where the initial context setup response may include a PDU session setup response list and a PDU session failed set up list.

In an aspect, the first approach to distinguish an RRC message for a particular subscription as discussed above may be used in the flow diagram(s) of FIG. 7 and/or FIG. 8. In this aspect, referring to FIG. 8, the RRC messages such as the UL RRC messages at 842, 864, and 872, the DL RRC messages at 836 and 866, the UE context setup request at 852, and the UE context setup request at 856 may include a second subscription identifier associated with the second SIM/second subscription. Referring to FIG. 7, the RRC messages such as the UL RRC messages at 742, 764, and 772, the DL RRC messages at 736 and 766, the UE context setup request at 752, and the UE context setup request at 756 may include a first subscription identifier associated with the first SIM/first subscription or may not include any subscription identifier.

In an aspect, the second approach to distinguish an RRC message for a particular subscription as discussed above may be used in the flow diagram(s) of FIG. 7 and/or FIG. 8. In this aspect, referring to FIG. 8, the initial UL message at 834, the DL RRC message at 836, the UL RRC message at 842, the bearer context setup request at 848, and the bearer context setup response at 850 may include the gNB-DU UE F1-AP ID and the gNB-CU UE F1-AP ID, at least one of which indicating a second UE-associated logical connection associated with the second SIM/second subscription. Referring to FIG. 7, the initial UL message at 734, the DL RRC message at 736, the UL RRC message at 742, the bearer context setup request at 748, and the bearer context setup response at 750 may include the gNB-DU UE F1-AP ID and the gNB-CU UE F1-AP ID, at least one of which indicating a first UE-associated logical connection associated with the first SIM/second subscription In an aspect, the third approach to distinguish an RRC message for a particular subscription as discussed above may be used in the flow diagram(s) of FIG. 7 and/or FIG. 8. In this aspect, the gNB 810 of FIG. 8 may be the gNB 710 and the gNB-DU 812 and the gNB-CU-UP 816 may be the gNB-DU 712 and the gNB-CU-UP 716 of FIG. 7, respectively, but the gNB-CU-CP 814 may be associated with the second SIM/second subscription and thus may be different from the gNB-CU-CP 714 of FIG. 7, which may be associated with the first SIM/first subscription.

In an aspect, the fourth approach to distinguish an RRC message for a particular subscription as discussed above may be used in the flow diagram(s) of FIG. 7 and/or FIG. 8. As discussed above, one or more SRBs may be used for an RRC message for a first subscription and different SRBs may be used for an RRC message for a second subscription. For example, SRB0, SRB1, and SRB2 may be indicated in RRC messages for the first subscription, and SRB5, SRB6, and SRB7 may be indicated in RRC messages for the second subscription. Therefore, if an RRC message indicates one or more of the SRB0, the SRB1, and the SRB2, the base station may determine that the RRC message is for the first subscription. On the other hand, if an RRC message indicates one or more of the SRB5, the SRB6, and the SRB7, the base station may determine that the RRC message is for the second subscription. The SRB0, the SRB1, and the SRB2 may respectively correspond to the SRB5, the SRB6, and the SRB7. In this example, in FIG. 7, the DL RRC message at 736 may include the SRB ID indicating the SRB0 to indicate the first subscription. Further, the UL RRC message at 742, the UL RRC message at 764, and the DL RRC message 766 may include the SRB ID indicating the SRB1 to indicate the first subscription. The UE context setup request at 752 and the UE context setup request at 756 may also include the SRB ID indicating the SRB1 to indicate the first subscription. Also, in this example, the UL RRC message at 772 may include the SRB ID indicating the SRB2 to indicate the first subscription. Further. in this example, in FIG. 8, the DL RRC message at 836 may include the SRB ID indicating the SRB5 to indicate the second subscription. In addition, the UL RRC message at 842, the UL RRC message at 864, and the DL RRC message 866 may include the SRB ID indicating the SRB6 to indicate the second subscription. The UE context setup request at 852 and the UE context setup request at 856 may also include the SRB ID indicating the SRB6 to indicate the second subscription. Also, in this example, the UL RRC message at 872 may include the SRB ID indicating the SRB7 to indicate the second subscription.

Figure 9:
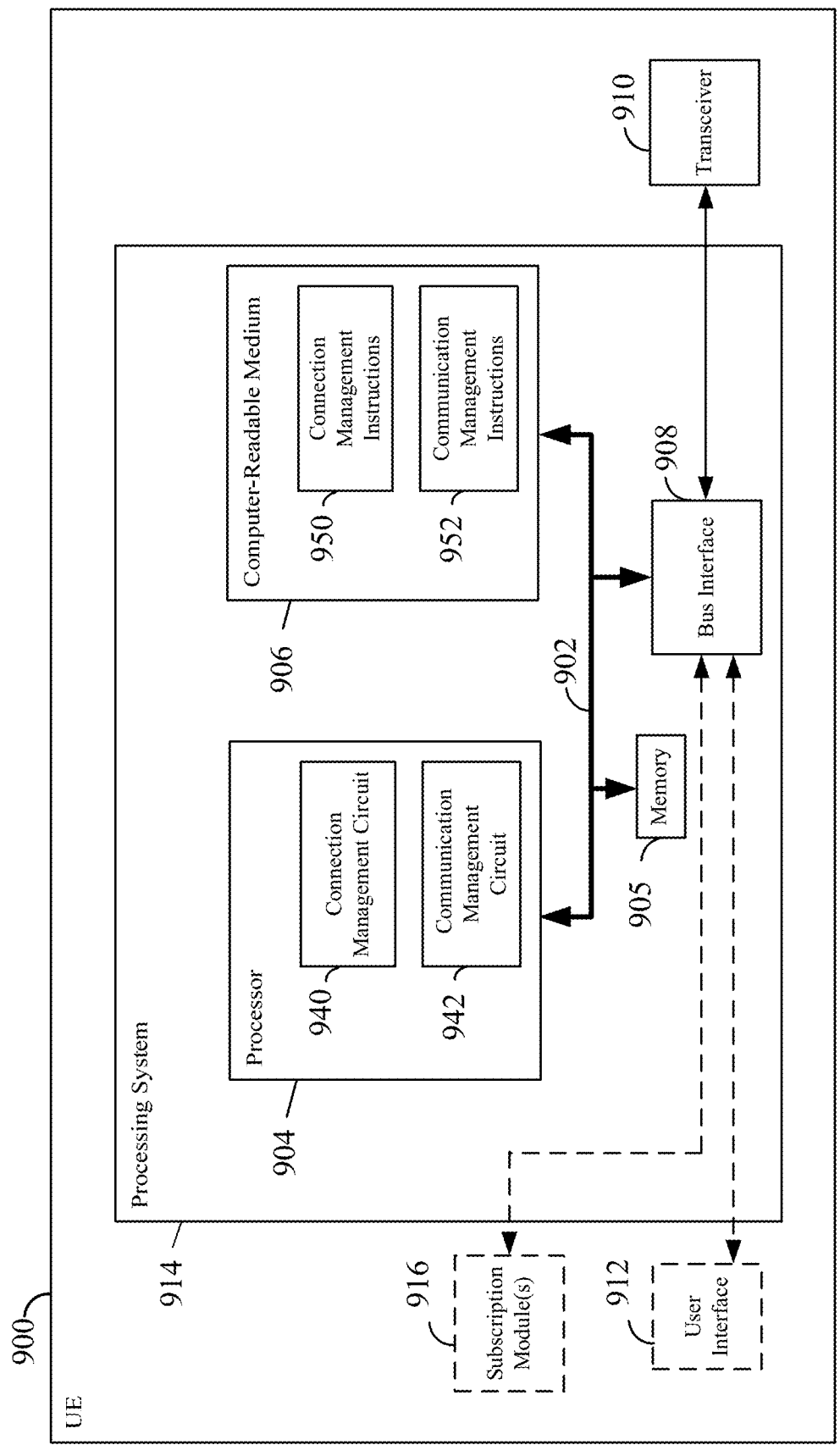
FIG. 9 is a block diagram conceptually illustrating an example of a hardware implementation for a user equipment according to some aspects of the disclosure.

FIG. 9 is a block diagram illustrating an example of a hardware implementation for a UE 900 employing a processing system 914. For example, the UE 900 may be a UE as illustrated in any one or more of FIGS. 1, 2, 3, 5, 6, 7, and/or 8.

The UE 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 900 may be configured to perform any one or more of the functions described herein. That is, the processor 904, as utilized in a UE 900, may be used to implement any one or more of the processes and procedures described below and illustrated in FIG. 10.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and processor-readable storage media (represented generally by the processor-readable storage medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a communication interface or means for communicating with various other apparatus over a transmission medium. In an aspect, the UE 900 may include a subscription module 916 that may be used to register with a service network. In such an aspect, the bus interface 908 may provide an interface between the bus 902, the transceiver 910, and the subscription module 916. In an aspect, the subscription module 916 may enable the UE 900 to use multiple subscriptions, such as a first subscription and a second subscription, to provide a service. The subscription module 916 may include multiple subscription modules respectively for the multiple subscriptions. Depending upon the nature of the apparatus, a user interface 912 (e.g., keypad, display, speaker, microphone, joystick) may also be provided. Of course, such a user interface 912 is optional, and may be omitted in some examples, such as a base station.

In some aspects of the disclosure, the processor 904 may include connection management circuitry 940 configured for various functions, including, for example, establishing a first connection with a base station via a communication link using the first subscription of the UE. For example, the connection management circuitry 940 may be configured to implement one or more of the functions described below in relation to FIG. 10, including, e.g., block 1002.

In some aspects of the disclosure, the connection management circuitry 940 may be configured for various functions, including, for example, establishing a second connection with the base station via the communication link using the second subscription of the UE. For example, the connection management circuitry 940 may be configured to implement one or more of the functions described below in relation to FIG. 10, including, e.g., block 1004.

In some aspects of the disclosure, the processor 904 may include communication management circuitry 942 configured for various functions, including, for example, performing at least one of a first communication, via the communication link, using the first subscription, or a second communication, via the communication link, using the second subscription. For example, the communication management circuitry 942 may be configured to implement one or more of the functions described below in relation to FIG. 10, including, e.g., block 1006.

The processor 904 is responsible for managing the bus 902 and general processing, including the execution of software stored on the processor-readable storage medium 906. The software, when executed by the processor 904, causes the processing system 914 to perform the various functions described below for any particular apparatus. The processor-readable storage medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium 906. The processor-readable storage medium 906 may be a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable storage medium 906 may reside in the processing system 914, external to the processing system 914, or distributed across multiple entities including the processing system 914. The processor-readable storage medium 906 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

In some aspects of the disclosure, the processor-readable storage medium 906 include connection management software/instructions 950 configured for various functions, including, for example, establishing a first connection with a base station via a communication link using the first subscription of the UE. For example, the connection management software/instructions 950 may be configured to implement one or more of the functions described below in relation to FIG. 10, including, e.g., block 1002.

In some aspects of the disclosure, the connection management software/instructions 950 may be configured for various functions, including, for example, establishing a second connection with the base station via the communication link using the second subscription of the UE. For example, the connection management software/instructions 950 may be configured to implement one or more of the functions described below in relation to FIG. 10, including, e.g., block 1004.

In some aspects of the disclosure, the processor-readable storage medium 906 may include communication management software/instructions 952 configured for various functions, including, for example, performing at least one of a first communication, via the communication link, using the first subscription, or a second communication, via the communication link, using the second subscription. For example, the communication management software/instructions 952 may be configured to implement one or more of the functions described below in relation to FIG. 10, including, e.g., block 1006.

Figure 10:
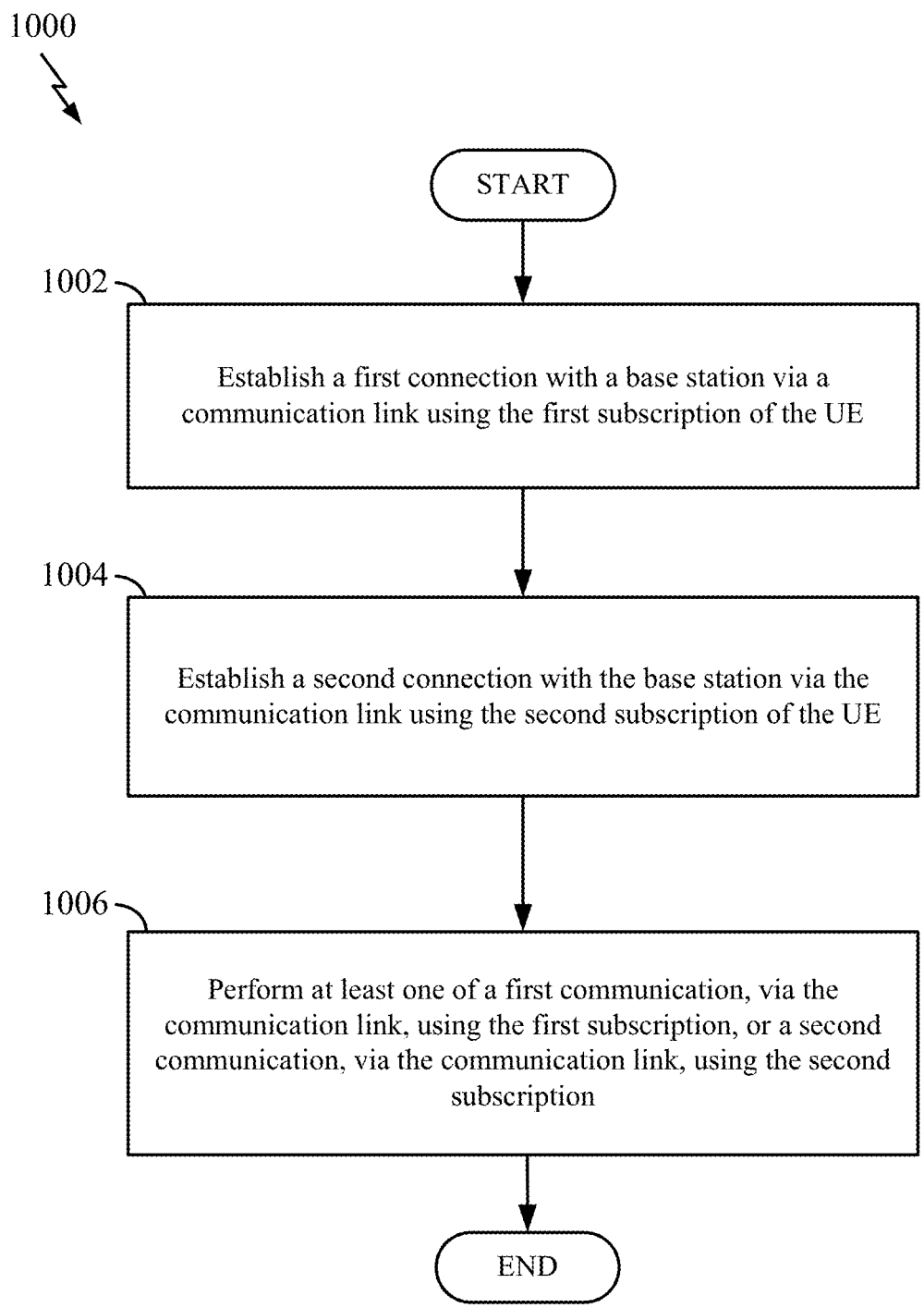
FIG. 10 is a flow chart illustrating an exemplary process for wireless communication by a user equipment, according to some aspects of the disclosure.

FIG. 10 is a flow chart illustrating an exemplary process 1000 for wireless communication by a UE, in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the UE 900 illustrated in FIG. 9. In some examples, the process 1000 may be carried out by any suitable apparatus or means for carrying out the functions or algorithm described below.

At block 1002, the process 1000 includes establishing a first connection with a base station via a communication link using the first subscription of the UE.

At block 1004, the process 1000 includes establishing a second connection with the base station via the communication link using the second subscription of the UE. In an aspect, the first connection may be a first RRC connection and the second connection may be a second RRC connection.

In an aspect, the establishing the first connection via the communication link using the first subscription may include performing a RACH procedure with the base station and a first RRC connection establishment procedure with the base station using the first subscription, and establishing the second connection via the communication link using the second subscription may include performing a second RRC connection establishment procedure with the base station using the second subscription without performing a RACH procedure. In an aspect, the second RRC connection establishment procedure may be performed without performing a RACH procedure to reduce latency associated with the second RRC connection establishment procedure.

In an aspect, the second connection may be established while the first connection established is active, and the establishing the second connection may include transmitting an RRC setup request to establish the second connection over at least one of a first SRB associated with the first connection or a second SRB associated with the second connection. In an aspect, the establishing the second connection may further include receiving an RRC setup message in response to the RRC setup request, wherein the RRC setup message is addressed to a first C-RNTI associated with the first connection. In an aspect, the RRC setup message may include a second C-RNTI associated with the second connection.

In an aspect, the first subscription may be associated with first security information and the second subscription may be associated with second security information different from the first security information.

At block 1006, the process 1000 may include performing at least one of a first communication, via the communication link, using the first subscription, or a second communication, via the communication link, using the second subscription.

In an aspect, the first communication may be a first RRC communication and the second communication may be a second RRC communication, and the first RRC communication may be performed via the first connection on the communication link and the second RRC communication may be performed via the second connection on the communication link.

In an aspect, the at least one of the first communication using the first subscription or the second communication using the second subscription may be performed via a UE protocol stack having a physical layer and a MAC layer that are shared for the first subscription and the second subscription. In an aspect, the first communication using the first subscription may be performed via a plurality of first upper layers in the UE protocol stack that are above the MAC layer, and the second communication using the second subscription may be performed via a plurality of second upper layers in the UE protocol stack that are above the MAC layer. In an aspect, first communication may be performed using a first set of the plurality of first upper layers via at least one first SRB and using a second set of the plurality of first upper layers via at least one first DRB, the at least one first SRB and the at least one first DRB being associated with the first subscription, and first communication may be performed using a first set of the plurality of first upper layers via at least one first SRB and using a second set of the plurality of first upper layers via at least one first DRB, the at least one first SRB and the at least one first DRB being associated with the first subscription.

In an aspect, the first set of the plurality of first upper layers may include a first RRC layer, a first PDCP layer of the plurality of first upper layers, a first RLC layer of the plurality of first upper layers, and the second set of the plurality of first upper layers may include a first SDAP layer, a second PDCP layer of the plurality of first upper layers, a second RLC layer of the plurality of first upper layers, and the first set of the plurality of second upper layers may include a second RRC layer, a first PDCP layer of the plurality of second upper layers, a first RLC layer of the plurality of second upper layers, and the second set of the plurality of second upper layers may include a second SDAP layer, a second PDCP layer of the plurality of second upper layers, a second RLC layer of the plurality of second upper layers.

In one configuration, the UE 900 may include means for establishing a first connection with a base station via a communication link using the first subscription of the UE, means for establishing a first connection with a base station via a communication link using the first subscription of the UE, and means for performing at least one of a first communication, via the communication link, using the first subscription, or a second communication, via the communication link, using the second subscription. In one aspect, the aforementioned means may be the processor(s) 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the processor-readable storage medium 906, or any other suitable apparatus or means described in any one of the FIGS. 1, 2, 3, 5, 6, 7, and/or 8, and utilizing, for example, the processes and/or algorithms described herein in relation to FIG. 10.

Figure 11:
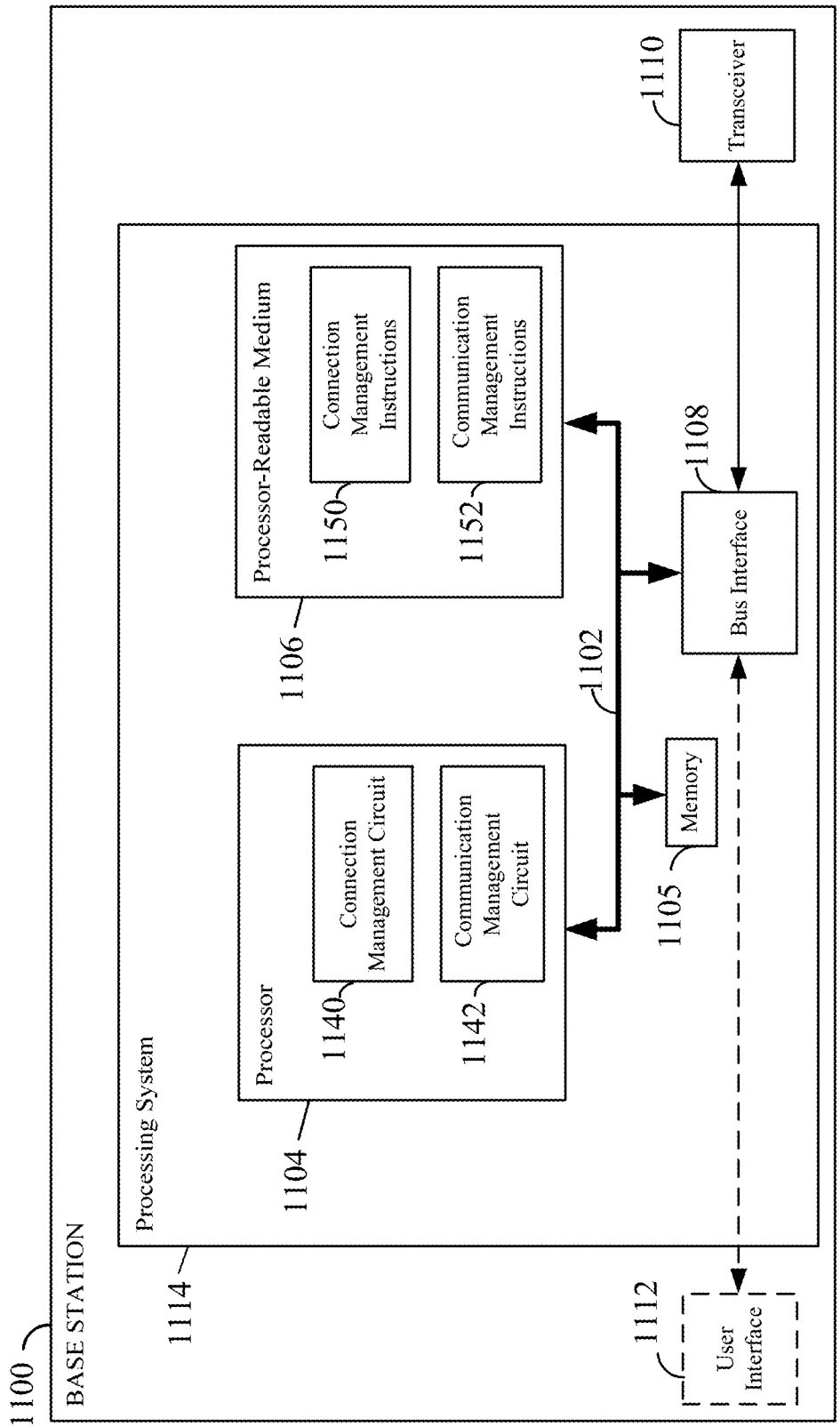
FIG. 11 is a block diagram conceptually illustrating an example of a hardware implementation for a base station according to some aspects of the disclosure.

FIG. 11 is a block diagram illustrating an example of a hardware implementation for a base station 1100 employing a processing system 1114. For example, the base station 1100 may be a base station as illustrated in any one or more of FIGS. 1, 2, 3, 5, 6, 7, and/or 8.

The base station 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1100 may be configured to perform any one or more of the functions described herein. That is, the processor 1104, as utilized in a base station 1100, may be used to implement any one or more of the processes and procedures described below and illustrated in FIG. 12.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and processor-readable storage media (represented generally by the processor-readable storage medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface or means for communicating with various other apparatus over a transmission medium. Depending upon the nature of the apparatus, a user interface 1112 (e.g., keypad, display, speaker, microphone, joystick) may also be provided. Of course, such a user interface 1112 is optional, and may be omitted in some examples, such as a base station.

In some aspects of the disclosure, the processor 1104 may include connection management circuitry 1140 configured for various functions, including, for example, establishing a first connection with a UE via a communication link using a first subscription of the UE, the UE being configured to communicate using the first subscription and a second subscription. For example, the connection management circuitry 1140 may be configured to implement one or more of the functions described below in relation to FIG. 12, including, e.g., block 1202.

In some aspects of the disclosure, the connection management circuitry 1140 may be configured for various functions, including, for example, establishing a second connection with the UE via the communication link using the second subscription of the UE. For example, the connection management circuitry 1140 may be configured to implement one or more of the functions described below in relation to FIG. 12, including, e.g., block 1204.

In some aspects of the disclosure, the processor 1104 may include communication management circuitry 1142 configured for various functions, including, for example, performing at least one of a first communication, via the communication link, using the first subscription or a second communication, via the communication link, using the second subscription. For example, the communication management circuitry 1142 may be configured to implement one or more of the functions described below in relation to FIG. 12, including, e.g., block 1206.

The processor 1104 is responsible for managing the bus 1102 and general processing, including the execution of software stored on the processor-readable storage medium 1106. The software, when executed by the processor 1104, causes the processing system 1114 to perform the various functions described below for any particular apparatus. The processor-readable storage medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium 1106. The processor-readable storage medium 1106 may be a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable storage medium 1106 may reside in the processing system 1114, external to the processing system 1114, or distributed across multiple entities including the processing system 1114. The processor-readable storage medium 1106 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

In some aspects of the disclosure, the processor-readable storage medium 1106 may include connection management software/instructions 1150 configured for various functions, including, for example, establishing a first connection with a (UE via a communication link using a first subscription of the UE, the UE being configured to communicate using the first subscription and a second subscription. For example, the connection management software/instructions 1150 may be configured to implement one or more of the functions described below in relation to FIG. 12, including, e.g., block 1202.

In some aspects of the disclosure, the connection management software/instructions 1150 may be configured for various functions, including, for example, establishing a second connection with the UE via the communication link using the second subscription of the UE. For example, the connection management software/instructions 1150 may be configured to implement one or more of the functions described below in relation to FIG. 12, including, e.g., block 1204.

In some aspects of the disclosure, the processor-readable storage medium 1106 may include communication management software/instructions 1152 configured for various functions, including, for example, performing at least one of a first communication, via the communication link, using the first subscription or a second communication, via the communication link, using the second subscription. For example, the communication management software/instructions 1152 may be configured to implement one or more of the functions described below in relation to FIG. 12, including, e.g., block 1206.

Figure 12:
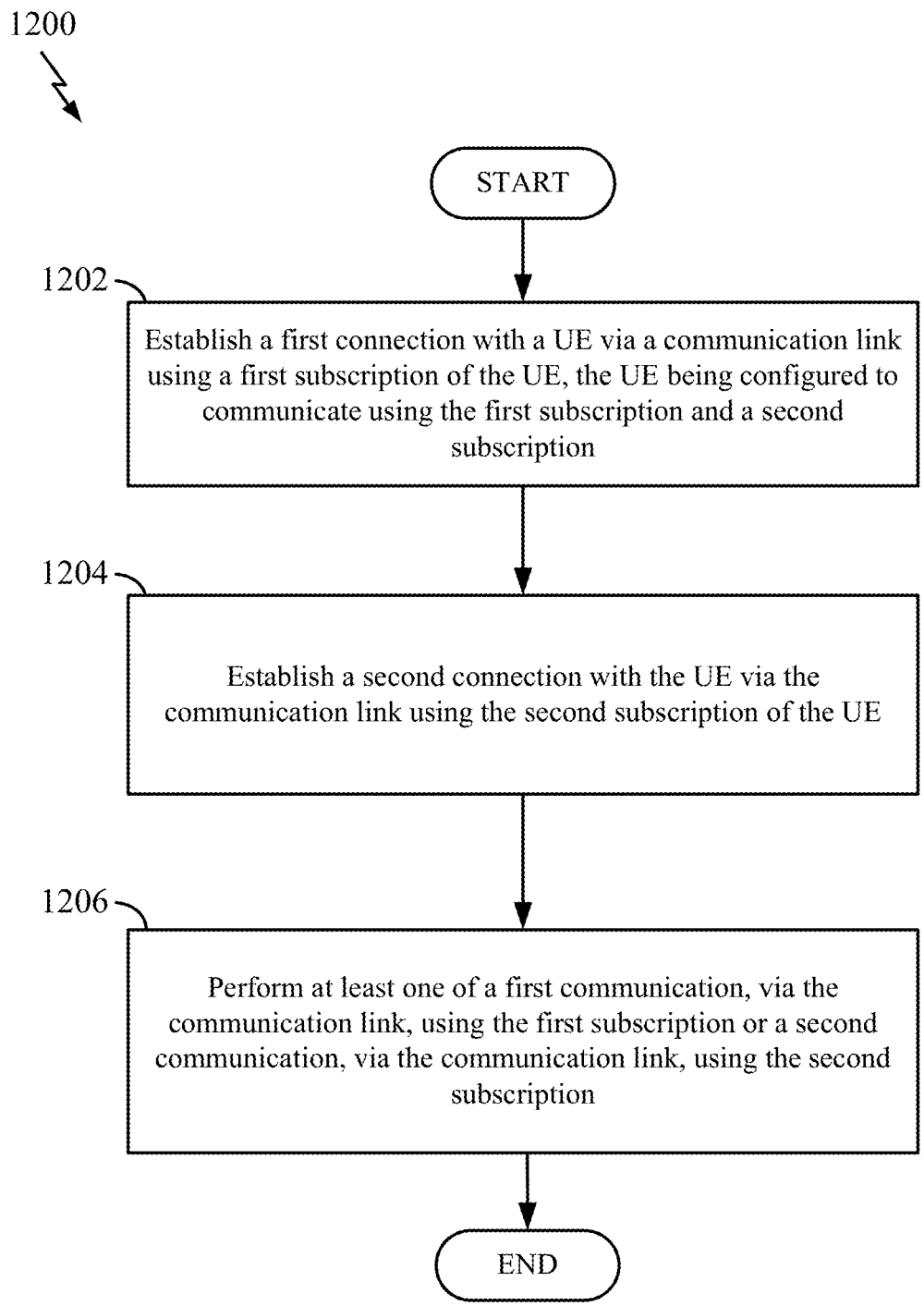
FIG. 12 is a flow chart illustrating an exemplary process for wireless communication by a base station, according to some aspects of the disclosure.

FIG. 12 is a flow chart illustrating an exemplary process 1200 for wireless communication by a base station, in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the base station 1100 illustrated in FIG. 11. In some examples, the process 1200 may be carried out by any suitable apparatus or means for carrying out the functions or algorithm described below.

At block 1202, the process 1200 includes establishing a first connection with a UE via a communication link using a first subscription of the UE, the UE being configured to communicate using the first subscription and a second subscription.

At block 1204, the process 1200 includes establishing a second connection with the UE via the communication link using the second subscription of the UE. In an aspect, the first connection may be a first RRC connection and the second connection may be a second RRC connection.

In an aspect, the establishing the first connection via the communication link using the first subscription may include performing a RACH procedure with the UE and a first RRC connection establishment procedure with the UE using the first subscription, and establishing the second connection via the communication link using the first subscription may include performing a second RRC connection establishment procedure with the UE using the second subscription without performing a RACH procedure. In an aspect, the second RRC connection establishment procedure may be performed without performing a RACH procedure to reduce latency associated with the second RRC connection establishment procedure.

In an aspect, the second connection may be established while the first connection established may be active. In this aspect, the establishing the second connection may include receiving an RRC setup request to establish the second connection over at least one of a first SRB associated with the first connection or a second SRB associated with the second connection. In an aspect, the establishing the second connection further may include transmitting an RRC setup message in response to the RRC setup request, wherein the RRC setup message is addressed to a first C-RNTI associated with the first connection. In an aspect, the RRC setup message may include a second C-RNTI associated with the second connection.

In an aspect, the at least one of the first communication using the first subscription or the second communication using the second subscription may be performed via a base station protocol stack having a physical layer and a MAC layer that are shared for the first subscription and the second subscription. In an aspect, the first communication using the first subscription may be performed via a plurality of first upper layers in the base station protocol stack that are above the MAC layer, and the second communication using the second subscription may be performed via a plurality of second upper layers in the base station protocol stack that are above the MAC layer.

In an aspect, the first communication may be performed using a first set of the plurality of first upper layers via at least one first SRB and using a second set of the plurality of first upper layers via at least one first DRB, the at least one first SRB and the at least one first DRB being associated with the first subscription, and the second communication may be performed using a first set of the plurality of second upper layers via at least one second SRB and using a second set of the plurality of second upper layers via at least one second DRB, the at least one second SRB and the at least one second DRB being associated with the second subscription. In an aspect, the first set of the plurality of first upper layers may include a first RRC layer, a first PDCP layer of the plurality of first upper layers, a first RLC layer of the plurality of first upper layers, and the second set of the plurality of first upper layers may include a first SDAP layer, a second PDCP layer of the plurality of first upper layers, a second RLC layer of the plurality of first upper layers, and the first set of the plurality of second upper layers may include a second RRC layer, a first PDCP layer of the plurality of second upper layers, a first RLC layer of the plurality of second upper layers, and the second set of the plurality of second upper layers may include a second SDAP layer, a second PDCP layer of the plurality of second upper layers, a second RLC layer of the plurality of second upper layers.

In an aspect, the establishing the first connection via the communication link using the first subscription may include receiving a first subscriber identity associated with the first subscription, and managing communication of one or more first messages associated with the first subscription between a distributed unit of the base station and a control plane of a centralized unit of the base station based on the first subscriber identity. In an aspect, the establishing the second connection via the communication link using the second subscription may include receiving a second subscriber identity associated with the second subscription, and managing communication of one or more second messages associated with the second subscription between the distributed unit of the base station and the control plane of the centralized unit of the base station based on the second subscriber identity. In an aspect, the first subscriber identity may be a first S-TMSI identifying the first subscription and the second subscriber identity may be a second S-TMSI identifying the second subscription.

In an aspect, the one or more first messages include a first subscription identifier associated with the first subscription based on the first subscriber identity, and the one or more second messages include a second subscription identifier associated with the second subscription based on the second subscriber identity. In an aspect, the one or more first messages are communicated via a first logical connection associated with the first subscription on a communication interface between the distributed unit and the control plane of the centralized unit of the base station, and the one or more second messages are communicated via a second logical connection associated with the second subscription on the communication interface between the distributed unit and the control plane of the centralized unit of the base station. In an aspect, the control plane of the centralized unit of the base station may include a first control plane associated with the first subscription and a second control plane associate with the second subscription, and the one or more first messages are communicated with the first control plane of the centralized unit of the base station, and the one or more second messages are communicated with the second control plane of the centralized unit of the base station. In an aspect, the one or more first messages include one or more first SRB identifiers associated with the first subscription, and the one or more second messages include one or more second SRB identifiers associated with the second subscription.

In an aspect, the first subscription may be associated with first security information and the second subscription may be associated with second security information different from the first security information.

At block 1206, the process 1200 includes performing at least one of a first communication, via the communication link, using the first subscription or a second communication, via the communication link, using the second subscription. In an aspect, the first communication may be a first RRC communication and the second communication may be a second RRC communication, and the first RRC communication may be performed via the first connection on the communication link and the second RRC communication may be performed via the second connection on the communication link.

In one configuration, the base station 1100 includes means for establishing a first connection with a UE via a communication link using a first subscription of the UE, the UE being configured to communicate using the first subscription and a second subscription, means for establishing a second connection with the UE via the communication link using the second subscription of the UE, and means for performing at least one of a first communication, via the communication link, using the first subscription or a second communication, via the communication link, using the second subscription. In one aspect, the aforementioned means may be the processor(s) 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the processor-readable storage medium 1106, or any other suitable apparatus or means described in any one of the FIGS. 1, 2, 3, 5, 6, 7, and/or 8, and utilizing, for example, the processes and/or algorithms described herein in relation to FIG. 12.

The following provides an overview of several aspects of the present disclosure.

Aspect 1: A method of wireless communication by a user equipment (UE) configured to communicate using a first subscription and a second subscription, the method comprising: establishing a first connection with a base station via a communication link using the first subscription of the UE; establishing a second connection with the base station via the communication link using the second subscription of the UE; and performing at least one of a first communication, via the communication link, using the first subscription, or a second communication, via the communication link, using the second subscription.

Aspect 2: The method of aspect 1, wherein the first connection is a first radio resource control (RRC) connection and the second connection is a second RRC connection.

Aspect 3: The method of aspect 1 or 2, wherein the first communication is a first radio resource control (RRC) communication and the second communication is a second RRC communication, and wherein the first RRC communication is performed via the first connection on the communication link and the second RRC communication is performed via the second connection on the communication link.

Aspect 4: The method of any of aspects 1 through 3, wherein the establishing the first connection via the communication link using the first subscription comprises performing a random access channel (RACH) procedure with the base station and a first radio resource control (RRC) connection establishment procedure with the base station using the first subscription, and wherein the establishing the second connection via the communication link using the second subscription comprises performing a second RRC connection establishment procedure with the base station using the second subscription without performing a RACH procedure.

Aspect 5: The method of aspect 4, wherein the second RRC connection establishment procedure is performed without performing a RACH procedure to reduce latency associated with the second RRC connection establishment procedure.

Aspect 6: The method of any of aspects 1-5, wherein the second connection is established while the first connection established is active, and wherein the establishing the second connection comprises: transmitting a radio resource control (RRC) setup request to establish the second connection over at least one of a first signaling radio bearer (SRB) associated with the first connection or a second SRB associated with the second connection.

Aspect 7: The method of aspect 6, wherein the establishing the second connection further comprises: receiving an RRC setup message in response to the RRC setup request, wherein the RRC setup message is addressed to a first cell radio network temporary identifier (C-RNTI) associated with the first connection.

Aspect 8: The method of aspect 7, wherein the RRC setup message includes a second C-RNTI associated with the second connection.

Aspect 9: The method of any of aspects 1 through 8, wherein the at least one of the first communication using the first subscription or the second communication using the second subscription is performed via a UE protocol stack having a physical layer and a media access (MAC) layer that are shared for the first subscription and the second subscription.

Aspect 10: The method of aspect 9, wherein the first communication using the first subscription is performed via a plurality of first upper layers in the UE protocol stack that are above the MAC layer, and wherein the second communication using the second subscription is performed via a plurality of second upper layers in the UE protocol stack that are above the MAC layer.

Aspect 11: The method of aspect 10, wherein the first communication is performed using a first set of the plurality of first upper layers via at least one first signaling radio bearer (SRB) and using a second set of the plurality of first upper layers via at least one first dedicated radio bearer (DRB), the at least one first SRB and the at least one first DRB being associated with the first subscription, and wherein the second communication is performed using a first set of the plurality of second upper layers via at least one second SRB and using a second set of the plurality of second upper layers via at least one second DRB, the at least one second SRB and the at least one second DRB being associated with the second subscription.

Aspect 12: The method of aspect 11, wherein the first set of the plurality of first upper layers includes a first radio resource control (RRC) layer, a first packet data convergence protocol (PDCP) layer of the plurality of first upper layers, a first radio link control (RLC) layer of the plurality of first upper layers, and the second set of the plurality of first upper layers includes a first service data adaptation protocol (SDAP) layer, a second PDCP layer of the plurality of first upper layers, a second RLC layer of the plurality of first upper layers, and wherein the first set of the plurality of second upper layers includes a second radio resource control (RRC) layer, a first PDCP layer of the plurality of second upper layers, a first RLC layer of the plurality of second upper layers, and the second set of the plurality of second upper layers includes a second SDAP layer, a second PDCP layer of the plurality of second upper layers, a second RLC layer of the plurality of second upper layers.

Aspect 13: The method of any of aspects 1 through 12, wherein the first subscription is associated with first security information and the second subscription is associated with second security information different from the first security information.

Aspect 14: A user equipment (UE) comprising: a transceiver configured to communicate with a radio access network, a memory, and a processor communicatively coupled to the transceiver and the memory, wherein the processor and the memory are configured to perform any one of aspects 1 through 13.

Aspect 15: A UE configured for wireless communication comprising at least one means for performing any one of aspects 1 through 13.

Aspect 16: A non-transitory processor-readable storage medium having instructions for a UE thereon, wherein the instructions, when executed by a processing circuit, cause the processing circuit to perform any one of aspects 1 through 13.

Aspect 17. A method of wireless communication by a base station comprising: establishing a first connection with a user equipment (UE) via a communication link using a first subscription of the UE, the UE being configured to communicate using the first subscription and a second subscription; establishing a second connection with the UE via the communication link using the second subscription of the UE; and performing at least one of a first communication, via the communication link, using the first subscription or a second communication, via the communication link, using the second subscription.

Aspect 18. The method of aspect 17, wherein the first connection is a first radio resource control (RRC) connection and the second connection is a second RRC connection.

Aspect 19. The method of aspect 17 or 18, wherein the first communication is a first radio resource control (RRC) communication and the second communication is a second RRC communication, and wherein the first RRC communication is performed via the first connection on the communication link and the second RRC communication is performed via the second connection on the communication link.

Aspect 20. The method of any of aspects 17 through 19, wherein the establishing the first connection via the communication link using the first subscription comprises performing a random access channel (RACH) procedure with the UE and a first radio resource control (RRC) connection establishment procedure with the UE using the first subscription, and wherein the establishing the second connection via the communication link using the first subscription comprises performing a second RRC connection establishment procedure with the UE using the second subscription without performing a RACH procedure.

Aspect 21. The method of aspect 20, wherein the second RRC connection establishment procedure is performed without performing a RACH procedure to reduce latency associated with the second RRC connection establishment procedure.

Aspect 22. The method of any of aspects 17 through 21, wherein the second connection is established while the first connection established is active, and wherein the establishing the second connection comprises: receiving a radio resource control (RRC) setup request to establish the second connection over at least one of a first signaling radio bearer (SRB) associated with the first connection or a second SRB associated with the second connection.

Aspect 23. The method of aspect 22, wherein the establishing the second connection further comprises: transmitting an RRC setup message in response to the RRC setup request, wherein the RRC setup message is addressed to a first cell radio network temporary identifier (C-RNTI) associated with the first connection.

Aspect 24. The method of aspect 23, wherein the RRC setup message includes a second C-RNTI associated with the second connection.

Aspect 25. The method of any of aspects 17 through 24, wherein the at least one of the first communication using the first subscription or the second communication using the second subscription is performed via a base station protocol stack having a physical layer and a media access (MAC) layer that are shared for the first subscription and the second subscription.

Aspect 26. The method of aspect 25, wherein the first communication using the first subscription is performed via a plurality of first upper layers in the base station protocol stack that are above the MAC layer, and wherein the second communication using the second subscription is performed via a plurality of second upper layers in the base station protocol stack that are above the MAC layer.

Aspect 27. The method of aspect 26, wherein the first communication is performed using a first set of the plurality of first upper layers via at least one first signaling radio bearer (SRB) and using a second set of the plurality of first upper layers via at least one first dedicated radio bearer (DRB), the at least one first SRB and the at least one first DRB being associated with the first subscription, and wherein the second communication is performed using a first set of the plurality of second upper layers via at least one second SRB and using a second set of the plurality of second upper layers via at least one second DRB, the at least one second SRB and the at least one second DRB being associated with the second subscription.

Aspect 28. The method of aspect 27, wherein the first set of the plurality of first upper layers includes a first radio resource control (RRC) layer, a first packet data convergence protocol (PDCP) layer of the plurality of first upper layers, a first radio link control (RLC) layer of the plurality of first upper layers, and the second set of the plurality of first upper layers includes a first service data adaptation protocol (SDAP) layer, a second PDCP layer of the plurality of first upper layers, a second RLC layer of the plurality of first upper layers, and wherein the first set of the plurality of second upper layers includes a second radio resource control (RRC) layer, a first PDCP layer of the plurality of second upper layers, a first RLC layer of the plurality of second upper layers, and the second set of the plurality of second upper layers includes a second SDAP layer, a second PDCP layer of the plurality of second upper layers, a second RLC layer of the plurality of second upper layers.

Aspect 29. The method of any of aspects 17 through 28, wherein the establishing the first connection via the communication link using the first subscription comprises: receiving a first subscriber identity associated with the first subscription; and managing communication of one or more first messages associated with the first subscription between a distributed unit of the base station and a control plane of a centralized unit of the base station based on the first subscriber identity, and wherein the establishing the second connection via the communication link using the second subscription comprises: receiving a second subscriber identity associated with the second subscription; and managing communication of one or more second messages associated with the second subscription between the distributed unit of the base station and the control plane of the centralized unit of the base station based on the second subscriber identity.

Aspect 30. The method of aspect 29, wherein the first subscriber identity is a first serving temporary mobile subscriber identity (S-TMSI) identifying the first subscription and the second subscriber identity is a second S-TMSI identifying the second subscription.

Aspect 31. The method of aspect 29 or 30, wherein the one or more first messages include a first subscription identifier associated with the first subscription based on the first subscriber identity, and wherein the one or more second messages include a second subscription identifier associated with the second subscription based on the second subscriber identity.

Aspect 32. The method of any of aspects 29-31, wherein the one or more first messages are communicated via a first logical connection associated with the first subscription on a communication interface between the distributed unit and the control plane of the centralized unit of the base station, and wherein the one or more second messages are communicated via a second logical connection associated with the second subscription on the communication interface between the distributed unit and the control plane of the centralized unit of the base station.

Aspect 33. The method of any of aspects 29-32, wherein the control plane of the centralized unit of the base station includes a first control plane associated with the first subscription and a second control plane associate with the second subscription, and wherein the one or more first messages are communicated with the first control plane of the centralized unit of the base station, and the one or more second messages are communicated with the second control plane of the centralized unit of the base station.

Aspect 34. The method of any one of aspect 29-33, wherein the one or more first messages include one or more first signaling radio bearer (SRB) identifiers associated with the first subscription, and wherein the one or more second messages include one or more second SRB identifiers associated with the second subscription.

Aspect 35. The method of any of aspects 17 through 34, wherein the first subscription is associated with first security information and the second subscription is associated with second security information different from the first security information.

Aspect 36: A base station comprising: a transceiver configured to communicate with a radio access network, a memory, and a processor communicatively coupled to the transceiver and the memory, wherein the processor and the memory are configured to perform any one of aspects 17 through 35.

Aspect 37: A base station configured for wireless communication comprising at least one means for performing any one of aspects 17 through 35.

Aspect 38: A non-transitory processor-readable storage medium having instructions for a base station thereon, wherein the instructions, when executed by a processing circuit, cause the processing circuit to perform any one of aspects 17 through 35.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of wireless communication by a user equipment (UE) configured to communicate using a first subscription and a second subscription, the method comprising:
  establishing a first connection with a base station via a communication link using the first subscription of the UE;
  establishing a second connection with the base station via the communication link using the second subscription of the UE, wherein the communication link is a common communication link shared by the first subscription and the second subscription; and
  performing at least one of a first communication, via the communication link, using the first subscription, or a second communication, via the communication link, using the second subscription, wherein the at least one of the first communication using the first subscription or the second communication using the second subscription is performed via a UE protocol stack having a physical layer and a media access (MAC) layer that are shared for the first subscription and the second subscription.

2. The method of claim 1, wherein the first communication is a first radio resource control (RRC) communication and the second communication is a second RRC communication, and
wherein the first RRC communication is performed via the first connection on the communication link and the second RRC communication is performed via the second connection on the communication link.

3. The method of claim 1, wherein the establishing the first connection via the communication link using the first subscription comprises performing a random access channel (RACH) procedure with the base station and a first radio resource control (RRC) connection establishment procedure with the base station using the first subscription, and
wherein the establishing the second connection via the communication link using the second subscription comprises performing a second RRC connection establishment procedure with the base station using the second subscription without performing a RACH procedure.

4. The method of claim 1, wherein the second connection is established while the first connection established is active, and wherein the establishing the second connection comprises:
transmitting a radio resource control (RRC) setup request to establish the second connection over at least one of a first signaling radio bearer (SRB) associated with the first connection or a second SRB associated with the second connection.

5. The method of claim 4, wherein the establishing the second connection further comprises:
receiving an RRC setup message in response to the RRC setup request, wherein the RRC setup message is addressed to a first cell radio network temporary identifier (C-RNTI) associated with the first connection.

6. The method of claim 5, wherein the RRC setup message includes a second C-RNTI associated with the second connection.

7. The method of claim 1, wherein the first communication using the first subscription is performed via a plurality of first upper layers in the UE protocol stack that are above the MAC layer, and
wherein the second communication using the second subscription is performed via a plurality of second upper layers in the UE protocol stack that are above the MAC layer.

8. The method of claim 7, wherein the first communication is performed using a first set of the plurality of first upper layers via at least one first signaling radio bearer (SRB) and using a second set of the plurality of first upper layers via at least one first dedicated radio bearer (DRB), the at least one first SRB and the at least one first DRB being associated with the first subscription, and
wherein the second communication is performed using a first set of the plurality of second upper layers via at least one second SRB and using a second set of the plurality of second upper layers via at least one second DRB, the at least one second SRB and the at least one second DRB being associated with the second subscription.

9. The method of claim 8, wherein the first set of the plurality of first upper layers includes a first radio resource control (RRC) layer, a first packet data convergence protocol (PDCP) layer of the plurality of first upper layers, a first radio link control (RLC) layer of the plurality of first upper layers, and the second set of the plurality of first upper layers includes a first service data adaptation protocol (SDAP) layer, a second PDCP layer of the plurality of first upper layers, a second RLC layer of the plurality of first upper layers, and
wherein the first set of the plurality of second upper layers includes a second radio resource control (RRC) layer, a first PDCP layer of the plurality of second upper layers, a first RLC layer of the plurality of second upper layers, and the second set of the plurality of second upper layers includes a second SDAP layer, a second PDCP layer of the plurality of second upper layers, a second RLC layer of the plurality of second upper layers.

10. The method of claim 1, wherein the first subscription is associated with first security information and the second subscription is associated with second security information different from the first security information.

11. A user equipment (UE) for wireless communication, the UE being configured to communicate using a first subscription and a second subscription and comprising:
at least one processor;
a transceiver communicatively coupled to the at least one processor; and
a memory communicatively coupled to the at least one processor,
wherein the at least one processor is configured to:
establish a first connection with a base station via a communication link using the first subscription of the UE;
establish a second connection with the base station via the communication link using the second subscription of the UE, wherein the communication link is a common communication link shared by the first subscription and the second subscription; and
perform at least one of a first communication, via the communication link, using the first subscription, or a second communication, via the communication link, using the second subscription,
wherein the at least one of the first communication using the first subscription or the second communication using the second subscription is performed via a UE protocol stack having a physical layer and a media access (MAC) layer that are shared for the first subscription and the second subscription.

12. The UE of claim 11, wherein the first communication using the first subscription is performed via a plurality of first upper layers in the UE protocol stack that are above the MAC layer, and
wherein the second communication using the second subscription is performed via a plurality of second upper layers in the UE protocol stack that are above the MAC layer.

13. A method of wireless communication by a base station comprising:
establishing a first connection with a user equipment (UE) via a communication link using a first subscription of the UE, the UE being configured to communicate using the first subscription and a second subscription;
establishing a second connection with the UE via the communication link using the second subscription of the UE, wherein the communication link is a common communication link shared by the first subscription and the second subscription; and performing at least one of a first communication, via the communication link, using the first subscription or a second communication, via the communication link, using the second subscription, wherein the at least one of the first communication using the first subscription or the second communication using the second subscription is performed via a base station protocol stack having a physical layer and a media access (MAC) layer that are shared for the first subscription and the second subscription.

14. The method of claim 13, wherein the first communication is a first radio resource control (RRC) communication and the second communication is a second RRC communication, and wherein the first RRC communication is performed via the first connection on the communication link and the second RRC communication is performed via the second connection on the communication link.

15. The method of claim 13, wherein the establishing the first connection via the communication link using the first subscription comprises performing a random access channel (RACH) procedure with the UE and a first radio resource control (RRC) connection establishment procedure with the UE using the first subscription, and wherein the establishing the second connection via the communication link using the first subscription comprises performing a second RRC connection establishment procedure with the UE using the second subscription without performing a RACH procedure.

16. The method of claim 13, wherein the second connection is established while the first connection established is active, and wherein the establishing the second connection comprises:

receiving a radio resource control (RRC) setup request to establish the second connection over at least one of a first signaling radio bearer (SRB) associated with the first connection or a second SRB associated with the second connection.

17. The method of claim 16, wherein the establishing the second connection further comprises:

transmitting an RRC setup message in response to the RRC setup request, wherein the RRC setup message is addressed to a first cell radio network temporary identifier (C-RNTI) associated with the first connection.

18. The method of claim 17, wherein the RRC setup message includes a second C-RNTI associated with the second connection.

19. The method of claim 13, wherein the first communication using the first subscription is performed via a plurality of first upper layers in the base station protocol stack that are above the MAC layer, and wherein the second communication using the second subscription is performed via a plurality of second upper layers in the base station protocol stack that are above the MAC layer.

20. The method of claim 19, wherein the first communication is performed using a first set of the plurality of first upper layers via at least one first signaling radio bearer (SRB) and using a second set of the plurality of first upper layers via at least one first dedicated radio bearer (DRB), the at least one first SRB and the at least one first DRB being associated with the first subscription, and wherein the second communication is performed using a first set of the plurality of second upper layers via at least one second SRB and using a second set of the plurality of second upper layers via at least one second DRB, the at least one second SRB and the at least one second DRB being associated with the second subscription.

21. The method of claim 20, wherein the first set of the plurality of first upper layers includes a first radio resource control (RRC) layer, a first packet data convergence protocol (PDCP) layer of the plurality of first upper layers, a first radio link control (RLC) layer of the plurality of first upper layers, and the second set of the plurality of first upper layers includes a first service data adaptation protocol (SDAP) layer, a second PDCP layer of the plurality of first upper layers, a second RLC layer of the plurality of first upper layers, and wherein the first set of the plurality of second upper layers includes a second radio resource control (RRC) layer, a first PDCP layer of the plurality of second upper layers, a first RLC layer of the plurality of second upper layers, and the second set of the plurality of second upper layers includes a second SDAP layer, a second PDCP layer of the plurality of second upper layers, a second RLC layer of the plurality of second upper layers.

22. The method of claim 13, wherein the establishing the first connection via the communication link using the first subscription comprises:

receiving a first subscriber identity associated with the first subscription; and managing communication of one or more first messages associated with the first subscription between a distributed unit of the base station and a control plane of a centralized unit of the base station based on the first subscriber identity, and wherein the establishing the second connection via the communication link using the second subscription comprises:

receiving a second subscriber identity associated with the second subscription; and managing communication of one or more second messages associated with the second subscription between the distributed unit of the base station and the control plane of the centralized unit of the base station based on the second subscriber identity.

23. The method of claim 22, wherein the first subscriber identity is a first serving temporary mobile subscriber identity (S-TMSI) identifying the first subscription and the second subscriber identity is a second S-TMSI identifying the second subscription.

24. The method of claim 22, wherein the one or more first messages include a first subscription identifier associated with the first subscription based on the first subscriber identity, and wherein the one or more second messages include a second subscription identifier associated with the second subscription based on the second subscriber identity.

25. The method of claim 22, wherein the one or more first messages are communicated via a first logical connection associated with the first subscription on a communication interface between the distributed unit and the control plane of the centralized unit of the base station, and wherein the one or more second messages are communicated via a second logical connection associated with the second subscription on the communication interface between the distributed unit and the control plane of the centralized unit of the base station.

26. The method of claim 22, wherein the control plane of the centralized unit of the base station includes a first control plane associated with the first subscription and a second control plane associate with the second subscription, and
    wherein the one or more first messages are communicated with the first control plane of the centralized unit of the base station, and the one or more second messages are communicated with the second control plane of the centralized unit of the base station.

27. The method of claim 22, wherein the one or more first messages include one or more first signaling radio bearer (SRB) identifiers associated with the first subscription, and
    wherein the one or more second messages include one or more second SRB identifiers associated with the second subscription.

28. The method of claim 13, wherein the first subscription is associated with first security information and the second subscription is associated with second security information different from the first security information.

29. A base station for wireless communication, comprising:
    at least one processor;
    a transceiver communicatively coupled to the at least one processor; and
    a memory communicatively coupled to the at least one processor,
    wherein the at least one processor is configured to:
        establish a first connection with a user equipment (UE) via a communication link using a first subscription of the UE, the UE being configured to communicate using the first subscription and a second subscription;
        establish a second connection with the UE via the communication link using the second subscription of the UE, wherein the communication link is a common communication link shared by the first subscription and the second subscription; and
        perform at least one of a first communication, via the communication link, using the first subscription or a second communication, via the communication link, using the second subscription,
        wherein the at least one of the first communication using the first subscription or the second communication using the second subscription is performed via a base station protocol stack having a physical layer and a media access (MAC) layer that are shared for the first subscription and the second subscription.

30. The base station of claim 29, wherein the first communication using the first subscription is performed via a plurality of first upper layers in the base station protocol stack that are above the MAC layer, and
    wherein the second communication using the second subscription is performed via a plurality of second upper layers in the base station protocol stack that are above the MAC layer.

\* \* \* \* \*